United States Patent
Stravitz

(10) Patent No.: US 6,851,251 B2
(45) Date of Patent: *Feb. 8, 2005

(54) WASTE DISPOSAL DEVICES

(75) Inventor: David M. Stravitz, New York, NY (US)

(73) Assignee: Saniquest Industries Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/633,198

(22) Filed: Jul. 31, 2003

(65) Prior Publication Data

US 2004/0020175 A1 Feb. 5, 2004

Related U.S. Application Data

(60) Provisional application No. 60/400,379, filed on Jul. 31, 2002.

(51) Int. Cl.[7] .................................................. B65B 9/10
(52) U.S. Cl. .............................. 53/567; 53/526; 53/370
(58) Field of Search ......................... 53/138.3, 138.7, 53/138.8, 523, 526, 527, 567, 576, 577, 587, 370; 220/495.05, 495.06, 495.07, 495.08, 908

(56) References Cited

U.S. PATENT DOCUMENTS

| | | | |
|---|---|---|---|
| 3,779,157 A | * 12/1973 | Ross et al. ................... 100/240 |
| 4,162,602 A | 7/1979 | Achelpohl et al. |
| 4,561,563 A | 12/1985 | Woods |
| 4,760,784 A | 8/1988 | Whiteside |
| 4,869,049 A | 9/1989 | Richards et al. |
| 5,120,454 A | * 6/1992 | Wieties ....................... 210/767 |
| 5,125,526 A | * 6/1992 | Sumanis ................. 220/495.08 |
| 5,183,157 A | 2/1993 | Darden |
| 5,184,575 A | 2/1993 | Reinartz |
| 5,520,303 A | * 5/1996 | Bernstein et al. ...... 220/495.08 |
| 5,535,913 A | * 7/1996 | Asbach et al. ......... 220/495.08 |
| 5,590,512 A | 1/1997 | Richards et al. |
| 5,642,810 A | 7/1997 | Warner et al. |
| 5,655,680 A | 8/1997 | Asbach et al. |
| 5,671,847 A | 9/1997 | Pedersen et al. |
| 5,813,200 A | 9/1998 | Jacoby et al. |
| 5,884,556 A | 3/1999 | Klepacki et al. |
| 6,000,323 A | 12/1999 | Schlegel |
| 6,120,743 A | * 9/2000 | Papari ........................ 220/908 |
| 6,128,890 A | 10/2000 | Firth |
| 6,170,240 B1 | 1/2001 | Jacoby et al. |
| 6,370,847 B1 | 4/2002 | Jensen et al. |
| 6,453,640 B1 | 9/2002 | Hayashi |
| 6,612,099 B2 | 9/2003 | Stravitz |
| 2002/0162304 A1 | 11/2002 | Stravitz |
| 2003/0208995 A1 | 11/2003 | Stravitz |
| 2003/0213804 A1 | 11/2003 | Chomik et al. |

FOREIGN PATENT DOCUMENTS

WO    WO 02/083525 A1    10/2002

* cited by examiner

*Primary Examiner*—Louis Huynh
(74) *Attorney, Agent, or Firm*—Frishauf, Holtz, Goodman & Chick, P.C.

(57) ABSTRACT

Waste disposal device including a housing defining a waste compartment for receiving enclosed waste and arranged to removably receive a cartridge containing a length of flexible tubing which operatively receives waste therein, a retention mechanism for holding a quantity of waste received in the tubing and a rotation mechanism for rotating the retention mechanism when the quantity of waste is held thereby and while the cartridge is stationary in order to twist the tubing and enclose the held quantity of waste. The compartment in the housing receives the enclosed waste. The waste is thus rotated while the cartridge is held against rotation thereby enabling the formation of the twist above the waste to enclose or encapsulate the waste. A pushing mechanism may be provided on a cover of the device to push the waste into engagement with the retention mechanism.

65 Claims, 11 Drawing Sheets

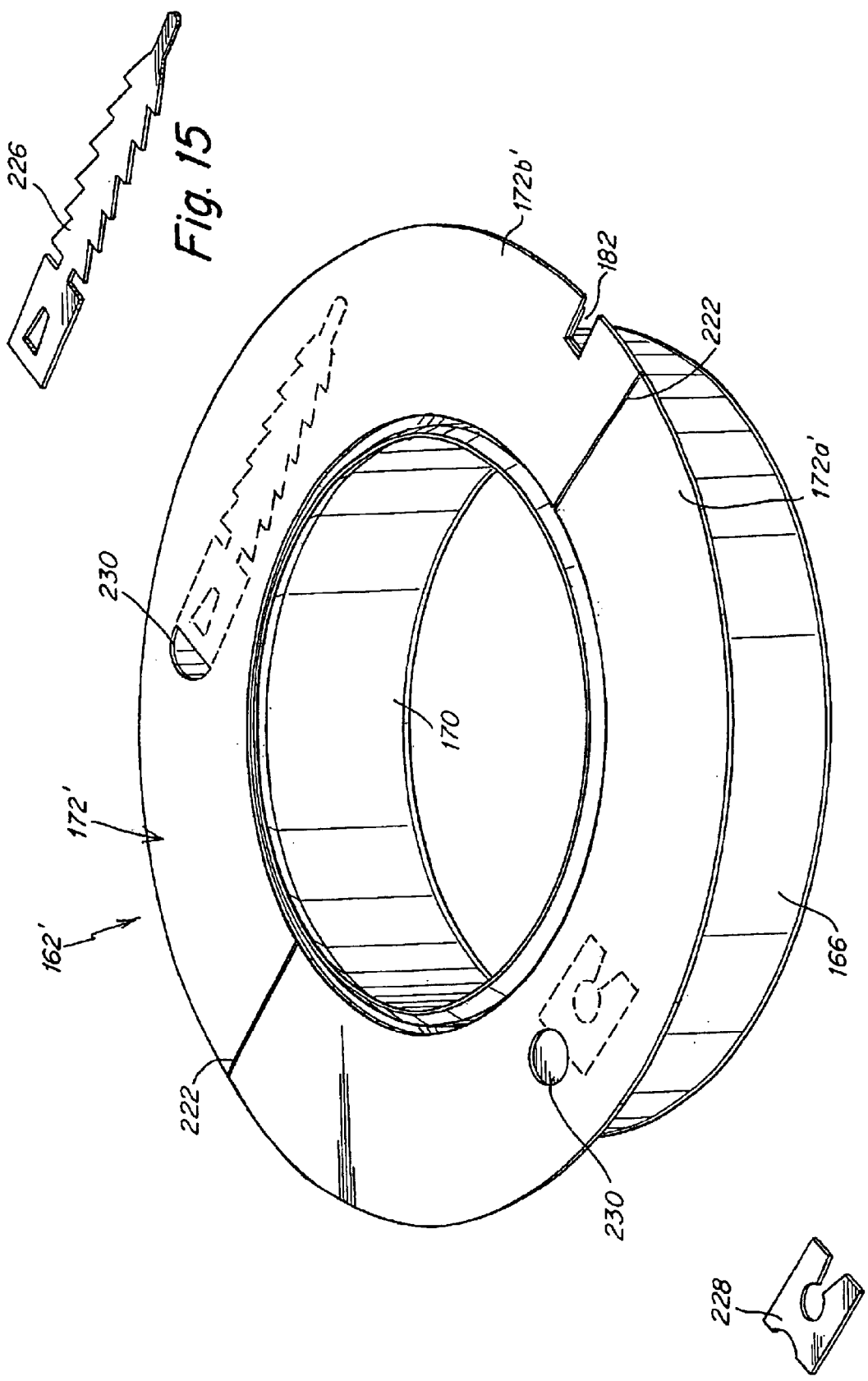

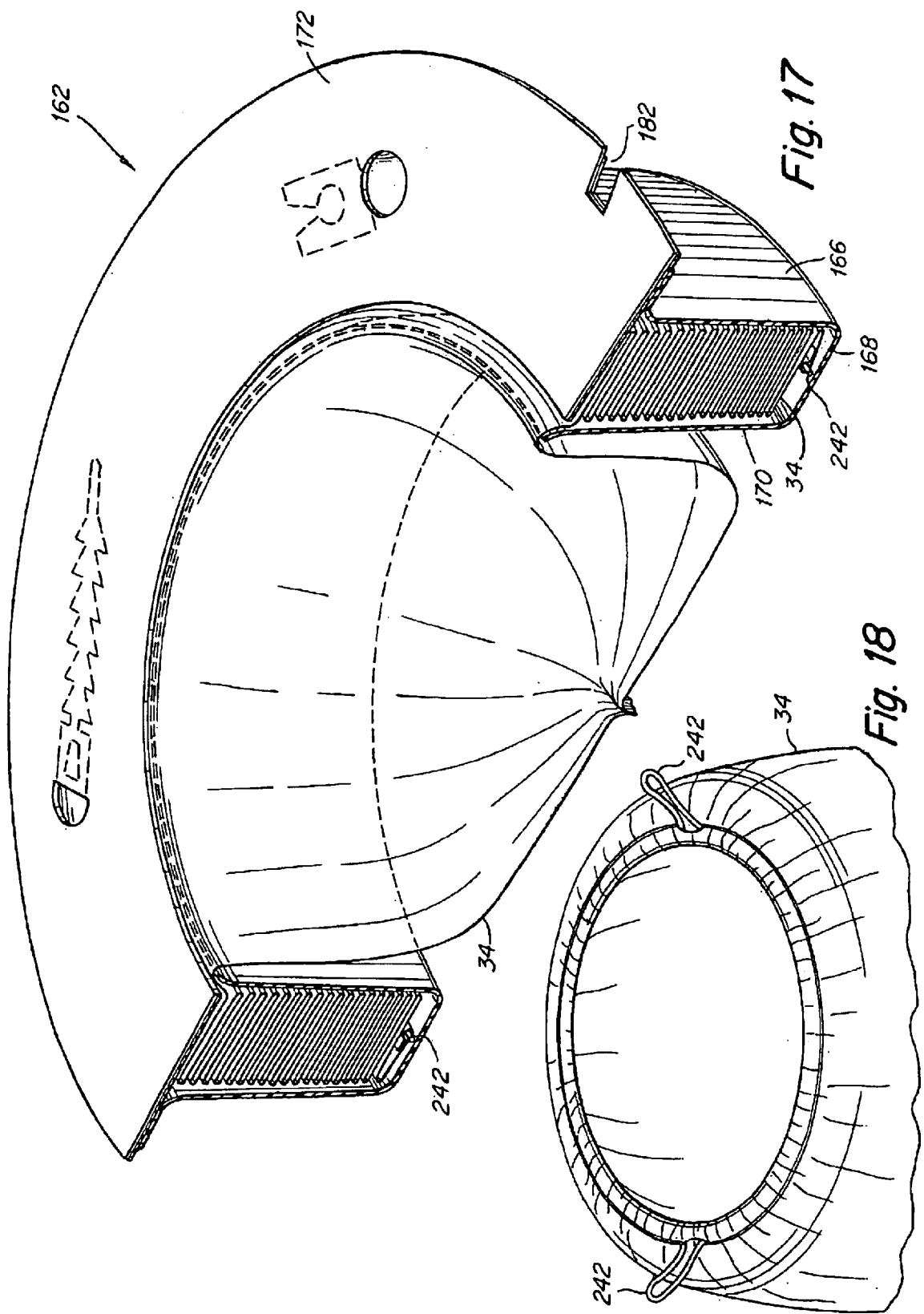

WASTE DISPOSAL DEVICES

CROSS REFERENCE TO RELATED APPLICATIONS

This application claims priority under 35 U.S.C. §119(e) of U.S. provisional patent application Ser. No. 60/400,379 filed Jul. 31, 2002, the entire contents of which are incorporated by reference herein.

This application is related to U.S. patent application Ser. No. 10/138,058 filed May 2, 2002, now U.S. Patent Publication No. 6,612,099 published Nov. 7, 2002, and U.S. patent application Ser. No. 10/456,428 filed Jun. 6, 2003, the entire contents of which are incorporated by reference herein.

FIELD OF INVENTION

This invention relates generally to waste disposal devices using packs of flexible tubing and, more particularly, to improved waste disposal devices for use in sanitary and odorless packaging and disposal of diapers or similar related waste, medical waste (such as, for example, gloves, gauze or any other waste which occurs in, for example, a doctor's office or hospital), industrial waste and any other waste wherein sanitary and substantially odorless disposal is desired and wherein germ containment is desired. While the invention relates to disposal of "waste" in general, the following detailed description is given with respect to disposal of diapers or the like for ease and convenience of description.

The present invention also relates to single-use, disposable cartridges of flexible tubing for waste disposal for placement in waste disposal devices, similar to those disclosed in U.S. patent application Ser. No. 6,612,099.

BACKGROUND OF THE INVENTION

In households having an infant or very young child wearing disposable diapers, a diaper pail is usually placed in the bathroom or nursery for the receipt and disposal of soiled diapers.

One prior art diaper pail is sold under the trademark "Diaper Genie". Diaper pails of the "Diaper Genie"™ type are shown in U.S. Pat. No. 4,869,049 (Richards et al.), U.S. Pat. No. 5,590,512 (Richards et al.), U.S. Pat. No. 5,813,200 (Jacoby et al.), U.S. Pat. No. 6,128,890 (Firth) and U.S. Pat. No. 6,170,240 (Jacoby et al.).

The diaper pails shown in these patents generally comprise a container formed with an internal ring-shaped flange. A tubular core or cartridge rests on the flange and houses a continuous length of flexible, substantially non-resilient plastic tubing. A twist rim is rotatably coupled to the cartridge and a mechanism is provided to hold a diaper stationary when the twist rim rotates to twist the tubing above an end of the diaper to form a twisted closure. A cover is removably attached to the container and includes a lid.

In use, a soiled diaper is inserted into a waste insertion reservoir bounded by the tubing and the twist rim is then manually rotated as the diaper is held stationary to cause the diaper to be enclosed or encapsulated in the tubing by the formation of a twist in the tubing above the diaper. Rotation of the twist rim also causes an additional amount of tubing to be removed from the cartridge and be pushed into the waste insertion reservoir to prepare it for a subsequent insertion of a diaper. The subsequent insertion of another diaper into the waste insertion reservoir causes the previously enclosed diaper to pass into the hollow interior of the container. A series of connected, closed and encapsulated waste packages is created and the encapsulation process can be continued until the tubing is exhausted or the container is full.

In U.S. patent application Ser. No. 10/138,058, problems with diaper pails of the Diaper Genie™ type are mentioned and innovative constructions of diaper pails are presented. Additional innovative constructions of diaper pails which also overcome problems with the conventional Diaper Genie™ type diaper pails are disclosed herein.

OBJECTS AND SUMMARY OF THE INVENTION

It is an object of the present invention to provide new and improved waste disposal devices, in particular for use in the disposal of disposable diapers, medical wastes and industrial waste.

It is another object of the present invention to provide improved waste disposal devices for the medical and health case industries for use in, for example, hospitals, doctors' offices, operating rooms, nursing homes, out-patient care and the home health care industry for disposal of non "sharps" including adult diapers, bloody/soiled bandages, dressings, disposable bibs, "chucks" and clothing, medical gloves and dialysis machine filters and other disposal medical waste.

It is yet another object of the present invention to provide new and improved waste disposal devices which use flexible tubing to dispose of waste packages.

It is a further object of the present invention to provide new and improved waste disposal devices which effectively contain and prevent the release of odors from waste packages.

It is yet another object of the present invention to provide an automatic twist mechanism for a diaper (or other waste) pail which eliminates problems associated with the required manual twisting of a twist rim in order to enclose or encapsulate a soiled diaper or other waste product.

Another object of the present invention is to provide new and improved cartridges of flexible tubing for waste disposal devices which retain such cartridges.

In order to achieve these objects and others, an exemplifying embodiment of a waste disposal device in accordance with the invention comprises a housing defining a waste compartment for receiving enclosed waste and arranged to removably receive a cartridge containing a length of flexible tubing which operatively receives waste therein, a retention mechanism for holding a quantity of waste received in the tubing and a rotation mechanism for rotating the retention mechanism when the quantity of waste is held thereby and while the cartridge is stationary in order to twist the tubing and enclose the held quantity of waste. The compartment in the housing receives the enclosed waste. Thus, in the invention, the waste is rotated while the cartridge is held against rotation thereby enabling the formation of the twist above the waste to enclose or encapsulate the waste.

The retention mechanism can take various forms. In one form, the retention mechanism comprises a cylindrical member defining a waste insertion chamber in an interior and the cartridge is arranged around the cylindrical member such that the tubing therein passes through the waste insertion chamber and receives waste when therein. Fins may be provided on the cylindrical member to impart downward movement to the waste when in the waste insertion chamber, i.e., urge the waste into the compartment as the twist is formed. To this end, the fins are advantageously angled such that an inward edge thereof is inclined at an angle of about 30° to a vertical axis of the cylindrical member. A ring gear is formed in connection with the cylindrical member for engaging with the rotation mechanism.

In another form, the retention mechanism comprises a frame defining a waste insertion chamber and a ring gear connected to the frame and engaging with the rotation mechanism. The frame includes a stepped portion which may rest on a flange of the housing, vertically extending walls, springs extending inward into the waste insertion chamber from the vertically extending walls to engage with the waste when received in the waste insertion chamber and a planar portion extending between the stepped portion and the vertically extending walls. The ring gear is formed in connection with the stepped portion.

The rotation mechanism may comprise a rotatable driving gear rotated by a drive motor whereby the retention mechanism converts rotation of the driving gear into rotation of the held quantity of waste, e.g., the cylindrical member holding the quantity of waste. The driving gear thus engages the ring gear of the retention mechanism.

In order to hold the cartridge stationary during rotation of the held quantity of waste upon rotation of the retention mechanism, the cartridge might include one or more cut-out portions whereby engagement members are arranged in the housing to engage the cut-out portions of the cartridge and thereby prevent rotation thereof. In addition to or instead of this cartridge holding mechanism, the cartridge can be formed with one or more flanges and projections arranged on the housing or a part thereof to surround the flanges and thereby prevent rotation of the cartridge. Furthermore, a notch may be formed in the cartridge and mate with a corresponding step formed in the housing so that also in this manner, rotation of the cartridge relative to the housing is prevented.

In embodiments wherein a cover is pivotally connected to the housing, a pushing mechanism may be arranged on the cover for urging waste into the retention mechanism upon pivoting of the cover into engagement with the housing, e.g., into engagement with the springs on the frame. The pushing mechanism may comprise a truncated, cone-shaped projection removably mounted on a lower surface of the cover or a lug formed on a lower surface of the cover.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 14 is a perspective view of another embodiment of a cartridge of flexible tubing for use in the invention;

FIG. 15 is a perspective view of a tie upon removal from the cover of the cartridge shown in FIG. 14;

FIG. 16 is a perspective view of a clasp upon removal from the cover of the cartridge shown in FIG. 14;

FIG. 17 is a perspective, cross-sectional view of another embodiment of a cartridge of flexible tubing for use in the invention; and FIG. 18 is a perspective view of the end of the tubing of the cartridge shown in FIG. 17 after removal from the cartridge.

DETAILED DESCRIPTION OF THE INVENTION

Figure 1:
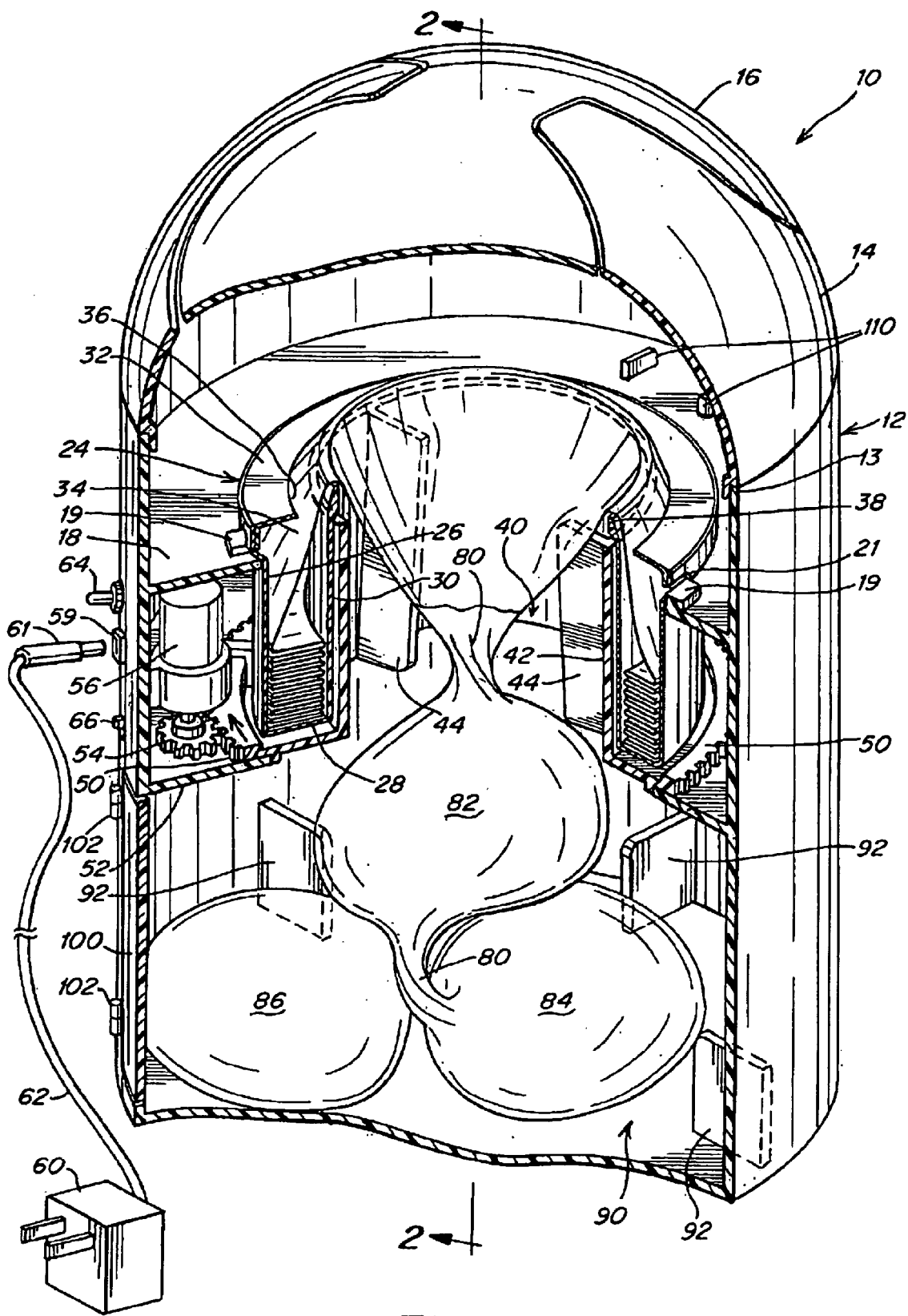
FIG. 1 is a partially cut-away perspective view of a first embodiment of a waste disposal device in accordance with the present invention with a first type of cartridge placed therein.

Several embodiments of waste disposal devices in accordance with the invention are described below. Generally, the waste disposal devices provide for rotation of a retention unit, mechanism or member which holds a quantity of waste in and relative to a cartridge of flexible tubing which is prevented from rotated, e.g., by being held stationary. In this manner, the flexible tubing is caused to twist above the quantity of waste thereby enclosing or encapsulating the held quantity of waste in the tubing. The enclosed waste is then urged into a waste receiving chamber of the waste disposal device upon the insertion of another waste package into the device to be enclosed or in some embodiments, provisions are made to enable the enclosed waste to be drawn into the waste receiving chamber upon twisting of the flexible tubing without dependency on the subsequent insertion of another quantity of waste. In either case, repeated insertions of waste cause the formation of a chain or series of enclosed waste which can be removed from the container when the container is full or the tubing is exhausted.

Throughout the several views, the same reference numerals will be used to designate the same or similar elements. Variations in the elements may be present in the drawings and if so, it is to demonstrate that the elements can have different forms.

FIGS. 1–4 show a first embodiment of a waste disposal device according to the present invention designated generally at 10. The waste disposal device 10 comprises a generally cylindrical housing or container 12 having a removable cover 14. The cover 14 fits snugly on an upper rim 13 of the housing 12 and has a swingable member 16 which is openable to define a waste insertion opening. The open position of the swingable member 16 is shown in FIG.

2 in chain lines. The swingable member 16, which is pivotally and swingably mounted to the cover 14, is shown only by way of example. Other opening devices, or a lift-top cover, can be provided, as desired. In the illustrated embodiment, the swingable member 16 is pivotable about a pivot axis defined by a pivot pin at the top of the swingable member 16 and pivots between an open position to provide access to the interior of the housing 12, and a closed position to essentially close off the interior of the housing 12.

A removable or replaceable cartridge 24 rests on a flange 18 of the housing 12 and contains a circumferentially pleated length of flexible tubing 34 therein. The tubing 34 is flexible and may constitute a polybag. The cartridge 24 includes a cylindrical outer wall 26, a lower wall 28, an inner wall 30 and an upper wall 32 which together define a cavity for receiving the circumferentially pleated length of flexible tubing 34. A ring-shaped opening 36 is defined between the upper portion of the inner wall 30 and the upper wall 32 for passage of the tubing 34 therethrough, as shown in FIG. 1.

Figure 2:
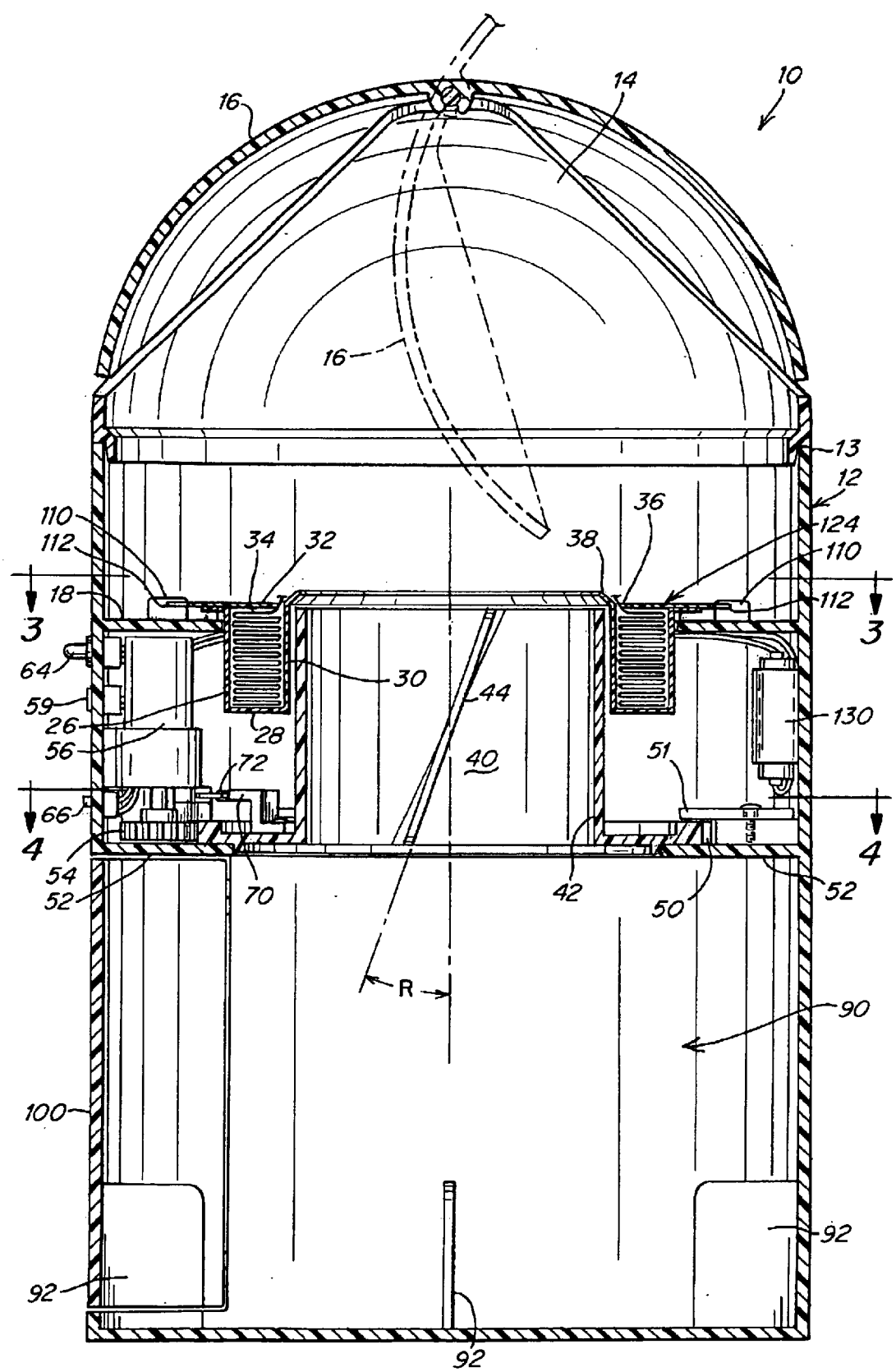
FIG. 2 is a cross-sectional view taken along line 2—2 in FIG. 1 with a second type of cartridge placed therein.

The inner wall 30 is provided with an annular upper lip 38 over which the tubing 34 passes into a waste insertion chamber 40 defined by a cylindrical member 42 which is rotatable relative to the housing 12 (see FIG. 2). The waste insertion chamber 40 is in communication with the waste insertion opening defined by the cover 14. In use, waste is placed into the tubing 34 present in the waste insertion chamber 40.

The outer wall 26 of the cartridge 24 includes an outwardly flared portion which overlies and rests on the flange 18. Instead of or in addition to having the flange 18 support the cartridge 24, it is also possible that the cartridge 24 may be supported by constructing the annular lip 38 of the inner wall 30 to rest on the upper edge of the cylindrical member 42. In this case however, the cylindrical member 42 rotates relative to the cartridge 24 so a low-friction supporting accommodation is desirable.

As discussed below with reference to FIGS. 11–18, the cartridge 24 may be designed to be a single-use, disposable cartridge with a self-closing function, i.e., include a closing mechanism to enable the cartridge 24 to be closed upon itself so that it can then be pushed through the waste insertion chamber 40 into the waste storage compartment 90 defined in the housing 12. In this manner, the end of the tubing 34 does not have to be tied or clamped closed as it would be closed upon closure of the cartridge 24. Using such cartridges 24, it would not be necessary to remove the cartridge 24 from the housing 12 but rather, the cartridge 24 would be placed into the waste storage compartment 90 and removed with the waste therefrom.

However, in the event a non-self-closing cartridge 24 is used, when the tubing 34 in the cartridge 24 is used up, the cartridge 24 may be removed from the housing 12 by first removing the cover 14 from the container 12, and then lifting the cartridge 24 out. A new, full cartridge 24 is then placed on the flange 18, a length of the tubing 34 from this new, full cartridge is removed, if necessary, and the removed length of tubing 34 is pressed into the waste insertion chamber 40, and the cover 14 is then closed. The tubing 34 is preferably sealed at the beginning end thereof (as discussed below with reference to FIGS. 11–18). However, if the tubing 34 has an open bottom (i.e., is not sealed at the end thereof), it can be tied closed before closing the cover 14, or some other tie or clamp mechanism can be used, such as a polybag tie, a clip, etc. to close off the open end before use.

A rotatable retention mechanism is provided to hold the waste in the tubing 34 after its insertion into the waste insertion chamber 40 and a rotation mechanism is provided to rotate the waste when held by the retention mechanism in the waste insertion chamber 40.

Figure 5:
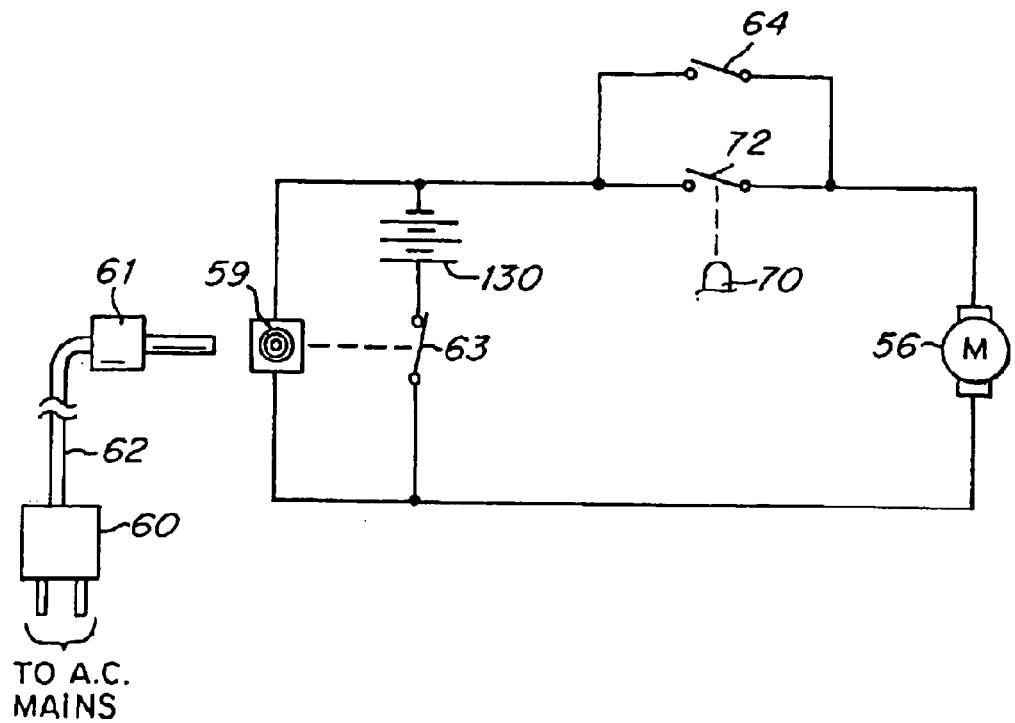
FIG. 5 is an electrical circuit diagram for use in the waste disposal device shown in FIGS. 1–4.

The rotation mechanism comprises a driving gear 54 connected to an output, drive shaft of a drive motor 56 which receives power from a battery 130 or an external power source 60 via a cable 62 (see FIG. 1). The motor 56 can be solely battery operated, as desired. An exemplary electrical circuit diagram for the rotation mechanism is shown in FIG. 5.

The retention mechanism converts the rotation of the driving gear 54 into rotation of the quantity of waste when received in the tubing 34 in the insertion waste chamber 40 defined by the cylindrical member 42. The retention mechanism includes the cylindrical member 42 and a ring gear 50 having radially, outwardly facing teeth at the lower end of the cylindrical member 42 (see FIGS. 2 and 4). The ring gear 50 rests on a flange 52 of the housing 12 and is rotatable relative to the flange 52. The cylindrical member 42 and ring gear 50 may be formed integral with one another or as separate components and connected together. The axis of rotation of the ring gear 50 and the axis of rotation of the driving gear 54 are parallel to one another, i.e., the ring gear 50 and the driving gear 54 both rotate in a horizontal plane.

Figure 4:
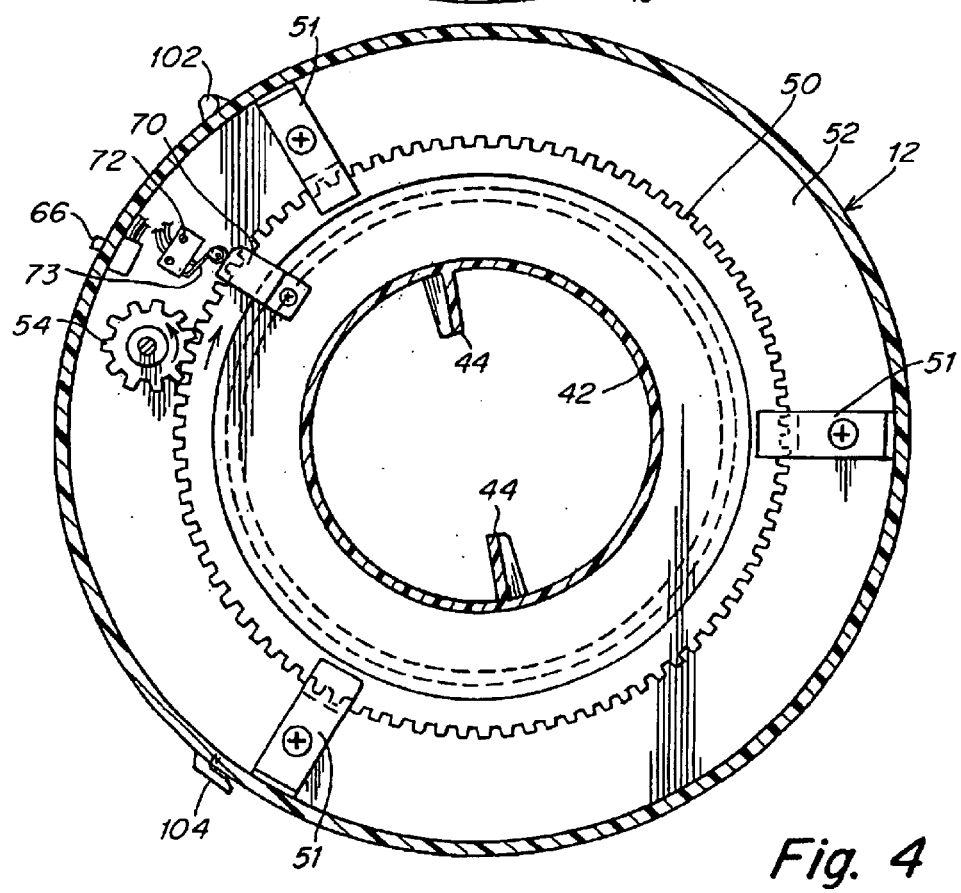
FIG. 4 is a sectional view taken along line 4—4 in FIG. 2, showing the gear assembly.

The ring gear 50 is maintained in its position resting on flange 52 by one or more holding members 51 which are connected to the flange 52 (see FIG. 4). The holding members 51 are arranged slightly spaced upwardly from the ring gear 50 to provide clearance so as to permit the ring gear 50 to rotate, while preventing the ring gear 50 from being lifted up out of the device 10 inadvertently. That is, the ring gear 50 is situated and rotates between the flange 52 and the holding members 51 (see FIG. 2). Other mechanisms for limiting the upward movement of the ring gear 51 from the flange 52, instead of or in addition to the holding members 51, can also be provided.

A manually operable switch 64 is provided to manually start the motor 56 so as to rotate drive gear 54 and in turn rotate driven ring gear 50. The switch 64 is connected to complete the electrical power circuit to the motor 56. Depressing the switch 64 causes the drive shaft of the motor 56 to rotate, thereby rotating the driven ring gear 50. The ring gear 50 includes a disengagement member 70 thereon (see FIG. 4). The electrical system also includes a normally closed switch 72 which is operated by the disengagement member 70.

The disengagement member 70 and switch 72 form part of a mechanism for automatically limiting the rotation of the retention mechanism, i.e., the cylindrical member 42 and the ring gear 50. The mechanism may be used to limit the rotation to one revolution.

In use, the switch 64 is manually depressed to start rotation of the drive shaft of the motor 56. At this point, the disengagement member 70 is moved in the clockwise direction so that it no longer engages a switch operation member 73 of the switch 72. When this happens, the manually operated switch 64 can be released, since the normally closed switch 72 will now be in the closed position so as to provide power to the motor 56 to enable the drive shaft of the motor 56 to continue to rotate, thereby continuing to drive the ring gear 50 (and cause rotation of the cylindrical member 42) in the clockwise direction. After a complete rotation of the disengagement member 70, the disengagement member 70 again contacts the switch operation member 73 of switch 72, and switches the normally closed switch 72 to the OPEN position, thereby interrupting power to the motor 56 (since the switch 64 was released), stopping the motor 56 and stopping the rotation of the ring gear 50 at the position shown in FIG. 4.

Alternative rotation mechanism can be used in the invention which convert a manual action into limited amount of rotation of the cylindrical member 42. Some rotation mechanisms which include a motive component, such as a motor, are disclosed in U.S. patent application Ser. No. 10/138,058 and can easily be adapted for use with the cylindrical member 42. It is also possible to provide for manual rotation of the cylindrical member without the use of electronic components and a motor, for example, by connecting a handle to the cylindrical member in a similar manner as disclosed in U.S. patent application Ser. No. 10/138,058.

The housing 12 also includes a mechanism for imparting downward movement to the waste in the waste insertion chamber 40 upon rotation of the cylindrical member 42. In the embodiment illustrated in FIGS. 1–4, this mechanism constitutes a pair of protruding members or fins 44 formed on the inner surface of the cylindrical member 42 which defines the waste insertion chamber 40. The fins 44 may be formed integral with the cylindrical member 42 or formed as separate components and connected thereto.

Preferably, the protruding fins 44 are inclined so as to drive the waste material, when surrounded by tubing 34, downward toward the bottom of the housing 12 as the cylindrical member 42 rotates (see FIG. 2). The angle R of the inclined protruding fins 44 shown in FIG. 2 may be approximately 30°. However, other inclination angles may be provided, as desired.

Although two fins 44 are shown, any number of fins 44 may be provided, and the size and inclination of the fins 44 appropriately determined, to ensure that a sufficient amount of downward movement is imparted to the waste held by the fins 44 upon rotation of the cylindrical member 42.

As the cylindrical member 42 rotates, the cartridge 24 remains stationary since it is held on the flange 18 of the container 12 by a holding mechanism (as described below), thereby causing the flexible tubing 34 to produce a twist in the area 80 shown in FIG. 1 and essentially closing off each waste insertion from the previous waste insertion. As shown in FIG. 1, three enclosed or encapsulated waste insertions 82, 84 and 86 are shown, each being closed off from the previous waste insertion by a twist 80 in the tubing 34.

After a waste storage compartment 90 defined in the housing 12 is filled with waste, or if it is desired to merely empty the waste storage compartment 90, a side door 100 (partially shown in FIG. 1), which is pivotally connected to the housing 12 by means of, for example, hinges 102, can be pivoted to the open position to gain access to the interior of the waste storage compartment 90. When the door 100 is open, the chain of enclosed waste insertions 82, 84, 86 in the storage compartment 90 can be removed.

Prior to removal of the chain of enclose waste insertions 82, 84, 86, when a self-closing, single-use cartridge is used (discussed below with reference to FIGS. 11–18), the cartridge is closed and pushed through the waste insertion chamber 40 into the waste storage compartment 90. Thus, the chain of enclosed waste insertions 82, 84, 86 and cartridge are all removed from the housing 12 when the door 100 is open.

However, if a multi-use cartridge 24 is placed in the housing 12 and tubing 34 still remains in the cartridge 24, the tubing 34 above the uppermost waste insertion can be cut, for example with scissors. A cutting device could also be included in or on the housing 12 for this purpose. To avoid the need to use scissors or a cutting device to cut the tubing 34, the tubing 34 can include perforation lines or depression lines at numerous locations along the length thereof so that the tubing 34 can be cut by tearing the tubing 34 along the nearest perforation line above the last waste insertion, with an allowance of some length of tubing 34 to enable the chain of waste insertions to be closed. Closure of the chain of waste insertions may be made with a tie, a clip or some other tie or clamp mechanism. The remaining length of the tubing 34 can also be tied or clamped to seal and close off the open end of the tubing 34 before the next use in order to enable the formation of another chain of enclosed waste insertions.

Figure 3:
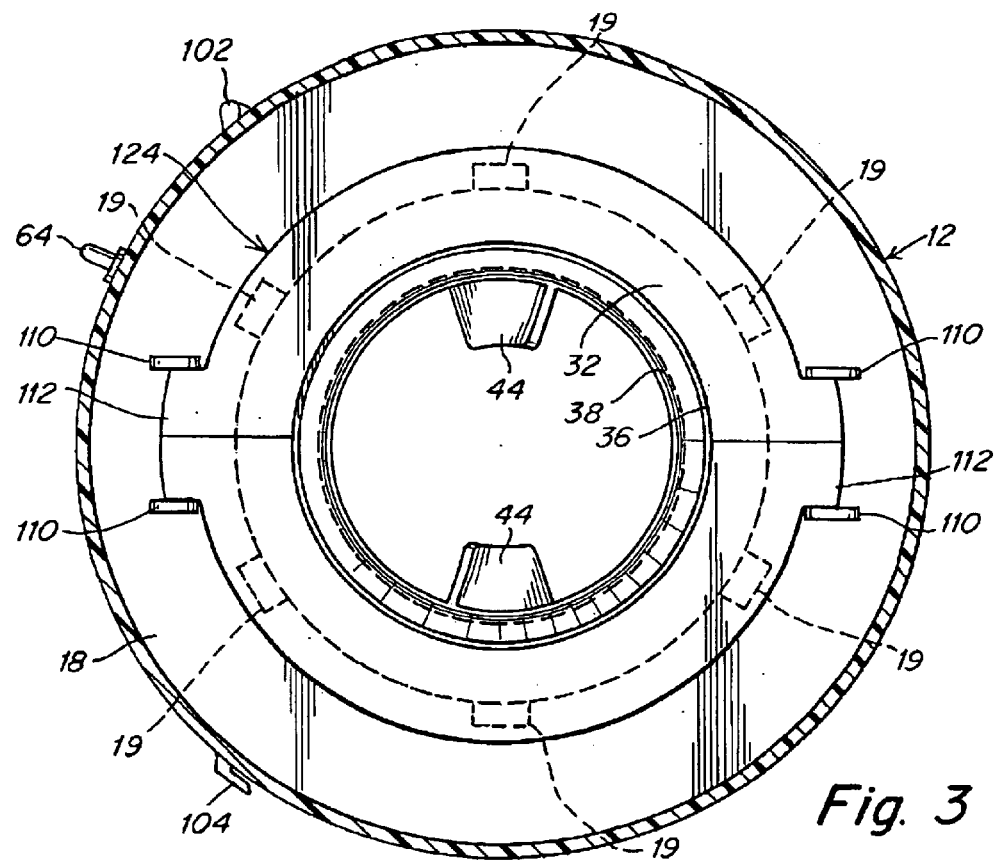
FIG. 3 is a sectional view taken along line 3—3 in FIG. 2.

After the removal of the waste, the door 100 is closed, and a latch 104 is engaged to maintain the door 100 securely in its closed position (see FIGS. 3 and 4).

The inner surface of the cylindrical wall of the housing 12 defining the waste storage compartment 90 may be provided with anti-rotation ribs or protruding members 92 which are designed to abut one or more of the enclosed waste insertions 82, 84, 86 to prevent them from rotating, thereby improving the effectiveness of the rotation of the cylindrical member 42 to produce the twist 80 in the tubing 34. The protruding members 92 essentially prevent the already enclosed waste insertions 82, 84, 86 in the compartment 90 from rotating, thereby enhancing the effectiveness of the twist 80 produced by rotating the cylindrical member 42. Also, the protruding members 92 prevent the waste insertions 82, 84, 86 from sliding around in the waste storage compartment 90.

Instead of or in addition to forming the protruding members 92 on the inner surface of the cylindrical wall of the housing 12, one or more protruding members can also be formed on the bottom wall of the housing 12 defining the waste storage compartment 90. Other constructions for preventing rotation of the enclosed waste insertions may also be provided, including those disclosed in U.S. patent application Ser. No. 10/138,058.

As discussed above, in order to provide for relative rotation between the cylindrical member 42 and the cartridge 24, a mechanism must be provided to hold the cartridge 24 in a stationary position and thereby prevent rotation of the cartridge 24 upon rotation of the waste held by the fins 44. To this end, in the embodiment illustrated in FIGS. 1–4, the cartridge 24 is held and prevented from rotating relative to the flange 18 on which it rests by engagement members 19 which each engage a respective cut-out portion 21 of the cartridge 24, thereby making the cartridge 24 non-rotatable relative to the housing 12. This ensures production of the twist 80 during operation of the device 10. The cut-out portions 21 may be formed in the flared portion of the outer wall 26.

An alternative or additional manner to hold the cartridge 24 stationary and prevent rotation thereof upon rotation of the waste when held by the fins 44 of the cylindrical member 42 would be to form a flange on the cartridge 24 and a cooperating retaining structure on the housing 12 or flange 18 thereof. For example, as shown in FIG. 3, the flange 18 has additional engaging members 110 formed on an upper surface which engage a protruding flange portion or upper flange member 112 of a different cartridge 124. This provides registration and prevents rotation of the cartridge 124 relative to the flange 18. The cartridge 124 is thus substantially the same as the cartridge 24 except that it has an upper flange member 112 which positioned between a pair of the members 110, thus not requiring engagement with the members 19 shown in FIG. 1.

Advantageously, multiple cartridge holding mechanisms are provided in the same housing 12, to the extent possible, to enable different types of cartridges to be retained. Thus, a single housing 12 could be used with multiple types of cartridges and the waste disposal device 10 would not be limited to use with a single type of cartridge.

Figure 10:
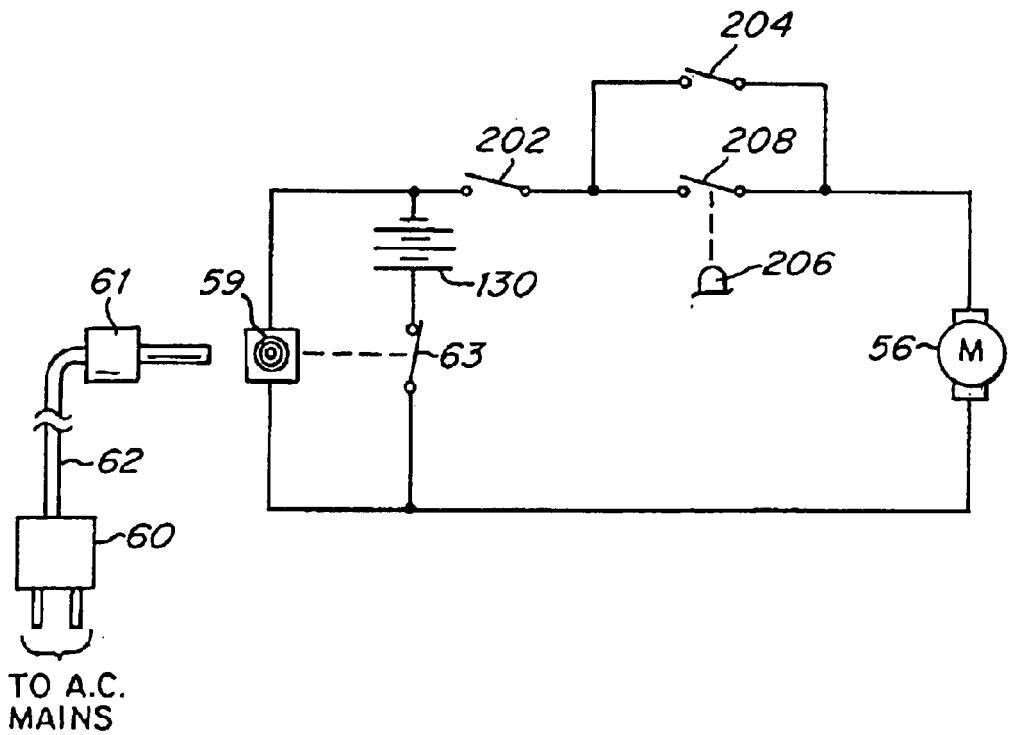
FIG. 10 is an electrical circuit diagram for use in the waste disposal device shown in FIGS. 6–9.

Referring again to FIG. 5, a replaceable battery 130 may be provided to operate the motor 56, in addition to, or in place of, the power supply which is connected to the AC mains. When a plug 61 is not plugged into a socket 59, a switch portion 63 of the socket 59 is in the closed position, thereby connecting the battery 130 to supply power to the motor 56 when one of the switches 64, 72 is closed (switch 64 being closed when manually depressed and switch 72 being normally closed but being open when the disengagement member 70 contacts the switch operation member 73 as shown in FIG. 4). When the plug 61 is plugged into the socket 59 to provide power to drive the motor 56, insertion of the plug 61 causes opening of the switch portion 63, thereby disconnecting the battery 130 from the circuit and connecting the power derived from the AC mains. Member 60 may be a conventional transformer used in low voltage applications, such as the present application. Optionally, a manually operable on/off switch 66 may be arranged on the housing 12 to enable operation of the motor 56 (an electrical circuit diagram showing the placement of such a switch in a position to enable operation of the motor 56 is shown in FIG. 10—the switch comparable to switch 66 being designated 202 therein).

The system of the present application is described using a motor 56 to drive the ring gear 50 to produce the twists 80 in the tubing 34. However, other rotation mechanisms can be used to produce the twist. For example, the manually operable lid and gear arrangement shown in FIGS. 1–7 of U.S. patent application Ser. No. 6,612,099 can be adapted for use with the system of the present invention, wherein the gear connected to the lid in said U.S. patent application Ser. No. 6,612,099 is coupled to drive the ring gear 52 when the cover to the apparatus is manually closed. Other mechanical and/or electrically operated rotation mechanisms, such as those shown in said U.S. patent application Ser. No. 6,612,099, for example, can be used and adapted to the waste disposal device of the present invention. As indicated above, the entire contents of U.S. patent application Ser. No. 6,612,099 are incorporated herein by reference.

Referring now to FIGS. 6–10, another embodiment of a waste disposal device in accordance with the invention, designated generally as 150, will be described. The waste disposal device 150 comprises a generally cylindrical housing or container 152 defined by a wall 154 which tapers slightly inward toward a base 156. The device 150 includes a cover 158 pivotally connected to a projection 160 extending from an outer surface of the wall 154.

A removable or replaceable cartridge 162 rests on ribs 164 extending inwardly from an inner surface of the wall 154 and contains a circumferentially pleated length of flexible tubing 34 therein. The cartridge 162 includes a cylindrical outer wall 166, a lower wall 168, a cylindrical inner wall 170 and an upper wall 172 which together define a cavity for receiving the circumferentially pleated length of flexible tubing 34. A flange 216 is formed on the outer wall 166 and is attached to the upper wall 172. A ring-shaped opening 174 is defined between the upper portion of the inner wall 170 and the upper wall 172 for passage of the tubing 34 therethrough.

The upper wall 172 of the cartridge 162 includes a notch 182 which is designed to accommodate a step 184 in one of the ribs 164. (The rib 164 with the step 184 does not provide support to the cartridge 162.) The notch 182 and step 184 serve to position the cartridge 162 in the housing 152 and also to hold the cartridge 162 stationary relative to the housing 152 and thereby prevent rotation of the cartridge 162 relative to the housing 152. Other mechanisms for holding the cartridge 162 stationary in the housing 152 while preventing rotation of the cartridge 162 relative to the housing 152 can also be used in the invention such as disclosed above and in U.S. patent application Ser. No. 10/138,058.

As discussed below with reference to FIGS. 11–18, the cartridge 162 may be designed to be a single-use, disposable cartridge with a self-close function. In this manner, the end of the tubing 34 does not have to be tied or clamped closed as it would be closed upon closure of the cartridge 162. Using such cartridges 162, it would not be necessary to remove the cartridge 162 from the housing 152 but rather, the cartridge 162 would be placed into the waste storage compartment 90 and removed with the waste therefrom. The cartridge 162 would instead be replaced with a new, full cartridge 162.

However, in the event a non-self-closing cartridge 162 is used, when the tubing 34 in the cartridge 162 is used up, the cartridge 162 may be removed from the housing 152 by pivoting the cover 158 upward and then lifting the cartridge 162 out. A new, full cartridge 162 is then placed onto the ribs 164 with the notch 182 positioned in the step 184, a length of the tubing 34 from this new, full cartridge is removed, if necessary, and the removed length of tubing 34 is pressed into a waste insertion chamber 176 defined by a retention mechanism 178, and the cover 158 is then closed. The tubing 34 is preferably sealed at the beginning end thereof. However, if the tubing 34 has an open bottom (i.e., is not sealed at the end thereof), it can be tied closed before closing the cover 158, or some other tie or clamp mechanism can be used, such as a polybag tie, a clip, etc. to close off the open end before use.

The cover 158 includes a projection 180 removably attached to a bottom surface 158a in the approximate shape of a truncated cone. The projection 180 is designed to impart downward movement to waste in the waste insertion chamber 176 defined by the retention mechanism 178, i.e., push the waste downward into the housing 152. The cover 158 thus has an open position in which the waste insertion chamber 176 is accessible and a closed position in which the projection 180 is partly situated in the waste insertion chamber 176 (see FIG. 7).

Figure 7:
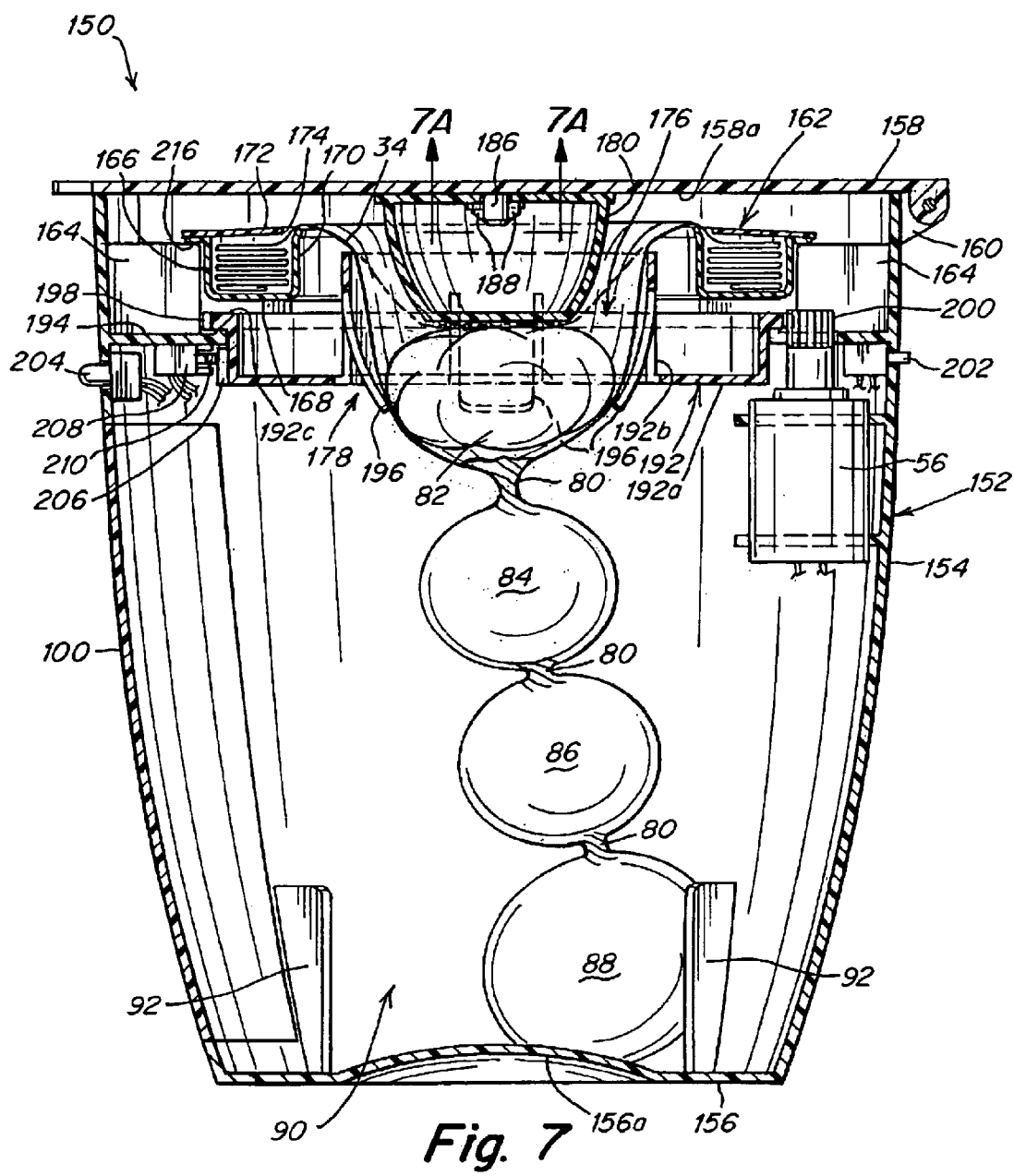
FIG. 7 is a cross-sectional side view taken along line 7—7 in FIG. 6.
Figure 7A:
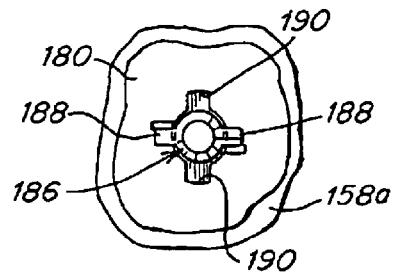
FIG. 7A is a bottom view of the bayonet-type connection along line 7A—7A in FIG.7.

The connection between the projection 180 and the cover 158 may be a bayonet-type connection wherein a projection 186 is formed on the cover 158 with radial stops or projections 188 and slots 190 are formed on the projection 180 (see FIG. 7A). The projection 180 is therefore attached to the cover 158 by positioning the projection 180 such that the slots 190 align with the stops 188 and then rotating the projection 180 in one direction relative to the cover 158. Removal of the projection 180, e.g., for cleaning purposes, is achieved by rotating the projection 180 relative to the cover 158 in the opposite direction and then once the stops 188 align with the slots 190, pulling the projection 180 away from the cover 158.

The retention mechanism 178 holds and rotates the waste after its insertion into the waste insertion chamber 176. The retention mechanism 178 rotatably rests on a flange 194 located inside the housing 152 along the inner surface of the wall 154, and may be integrally formed with the wall 154.

Flange 194 can conform to the cross-sectional shape of the wall 154. The ribs 164 may also be formed in connection with the flange 194.

The retention mechanism 178 is seated on the flange 194 and includes tongues or springs 196 adapted to grasp waste 82 when received by a portion of tubing 34 (see FIG. 7). Retention mechanism 178 has a frame 192 including a lower planar section 192a from which vertical walls 192b extend upward. The springs 196 extend inward from the vertical walls 192 and the vertical walls 192b define an enclosure in which the springs 196 retain the waste 82. A stepped section 192c is adjacent the outer edge of the planar section 192a and enables the frame 192 to be movably seated on the flange 194.

Retention mechanism 178 also includes a ring gear 198 formed in connection with the stepped section 192c. The ring gear 198 can be formed separate from the frame 192 and connected thereto or formed integral therewith.

Figure 9:
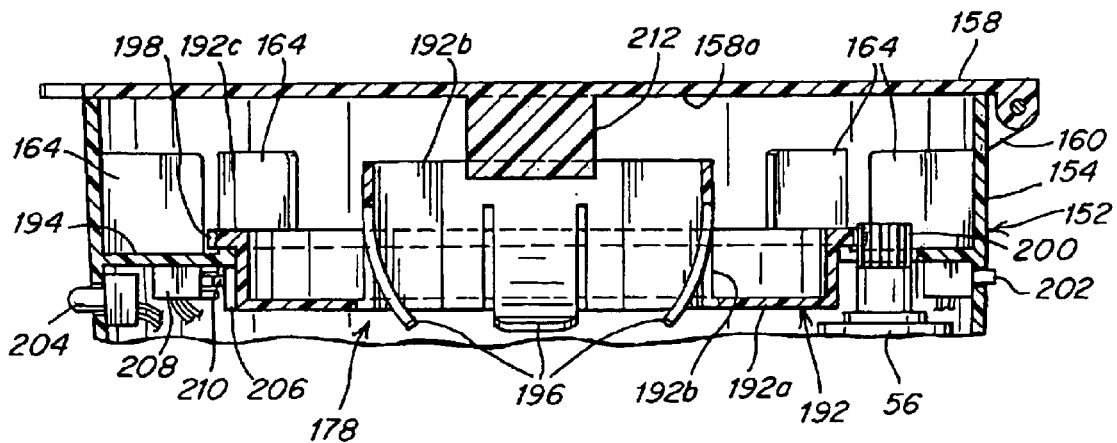
FIG. 9 is a cross-sectional side view similar to FIG. 7 but showing an alternate embodiment with the cartridge removed.

The truncated cone-shaped projection 180 is designed to force a waste insertion into the waste insertion chamber 176 and into engagement with the springs 196 upon closure of the cover 158 (see FIG. 7). The twist 80 in the tubing 34 is thus formed between the waste insertion and the projection 180. Instead of the truncated cone-shaped projection 180, a lug 212 may be formed integral with the cover 158 as shown in FIG. 9. The lug 212 serves the same purpose as the projection 180.

Figure 8:
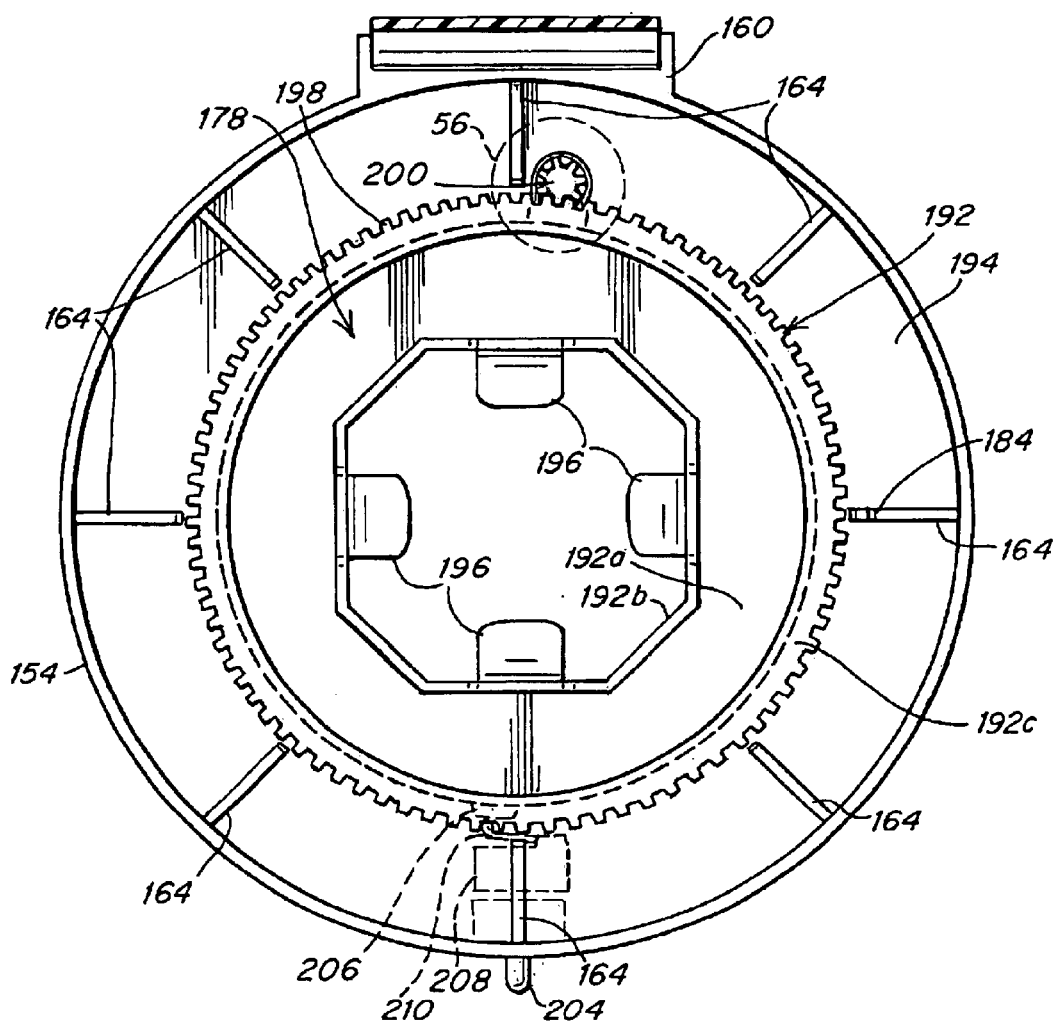
FIG. 8 is a cross-sectional plan view taken along line 8—8 in FIG. 6 with the cartridge removed.

The vertical walls 192b can be constructed to provide various shaped enclosures with a variable number of springs 196, e.g., a circular enclosure with three springs, a rectangular enclosure with four springs—one on each side and an octagonal enclosure with four springs—one on every other side (as shown in FIG. 8).

The waste disposal device 150 also includes a mechanism for rotating the retention mechanism 178. Specifically, the rotation mechanism includes a driving gear 200 connected to a shaft of a drive motor 56 which receives power from a battery 130 or an external power source 60 via a cable 62 (see FIG. 10). The motor 56 can be solely battery operated, as desired.

The driving gear 200 extends through an aperture formed in the flange 194 into engagement with the ring gear 198 (see FIGS. 7 and 8).

A manually operable on/off switch 202 is arranged on the housing 152 to enable operation of the motor 56, i.e., enable the motor 56 to rotate its output shaft so as to rotate driving gear 200 and in turn rotate ring gear 198 and thus the frame 192. When the switch 202 is in its on position, the electrical power circuit to the motor 56 can be completed (in the manner discussed below). When the switch 202 is in its off position, the electrical power circuit to the motor 56 cannot be completed regardless of whether the motor 56 is to be power by a battery 130 or via the AC mains (see FIG. 10).

A manually operated, momentary on switch 204 is also arranged on the housing and depressing the switch 204 causes the output shaft of the motor 56 to rotate, thereby rotating the driving gear 200 and in turn, the ring gear 198 and frame 192.

A disengagement member 206 is arranged on the stepped portion 192c of the frame 192 and may take the form of a cam (see FIG. 8). The electrical system also includes a normally closed switch 208 which is operated by the disengagement member 206.

In use, the switch 204 is manually depressed to start rotation of the output shaft of the motor 56. At this point, the disengagement member 206 is moved in the clockwise direction so that it no longer engages a switch operation member 210 of the switch 208. When this happens, the switch 204 can be released, since the normally closed switch 204 will now be in the closed position so as to provide power to the motor 56 to enable the output shaft of the motor 56 to continue to rotate, thereby continuing to drive the ring gear 198 (and cause rotation of the frame 192 of the retention mechanism 178). After one complete revolution of the retention mechanism 178 and thus the disengagement member 206, the disengagement member 206 again contacts the switch operation member 210 of switch 208, and switches the normally closed switch 208 to the OPEN position, thereby interrupting power to the motor 56 (since the switch 204 was released), stopping the motor 56 and stopping the rotation of the ring gear 198 at the position shown in FIG. 8.

Alternative rotation mechanism can be used in the invention which convert a manual action into limited amount of rotation of the retention mechanism 178. Some rotation mechanisms which include a motive component, such as a motor, are disclosed in U.S. patent application Ser. No. 6,612,099 and can easily be adapted for use with the retention mechanism 178. It is also possible to provide for manual rotation of the retention member without the use of electronic components and a motor, for example, by connecting a handle to the retention member in a similar manner as disclosed in U.S. patent application Ser. No. 6,612,099.

As the frame 192 of the retention mechanism 178 rotates, the cartridge 162 remains stationary since it is held on the ribs 164 of the housing 152, with the notch 182 positioned in the step 182, thereby causing the flexible tubing 34 to produce a twist in the area 80 shown in FIG. 7 and essentially closing off each waste insertion from the previous waste insertion. As shown in FIG. 7, four enclosed or encapsulated waste insertions 82, 84, 86 and 88 are shown, each being closed off from the previous waste insertion by a twist 80 in the tubing 34.

After a waste storage compartment 90 defined in the housing 152 is filled with waste, or if it is desired to merely empty the waste storage compartment 90, the side door 100 (see FIG. 6), which is pivotally connected to the housing 152 by means of, for example, hinges 102, can be pivoted to the open position to gain access to the interior of the waste storage compartment 90. When the door 100 is open, the chain of enclosed waste insertions 82, 84, 86, 88 in the storage compartment 90 can be removed.

Prior to removal of the chain of enclose waste insertions 82, 84, 86, 88, when a self-closing, single-use cartridge is used (discussed below with reference to FIGS. 11–18), the cartridge is closed and pushed through the waste insertion chamber 40 into the waste storage compartment 90. Thus, the chain of enclosed waste insertions 82, 84, 86, 88 and cartridge are all removed from the housing 152 when the door 100 is open.

However, if a multi-use cartridge is placed in the housing 152 and tubing 34 still remains in the cartridge, the tubing 34 above the uppermost waste insertion can be cut, for example with scissors. A cutting device could also be included in or on the housing 152 for this purpose. To avoid the need to use scissors or a cutting device to cut the tubing 34, the tubing 34 can include perforation lines or depression lines at numerous locations along the length thereof so that the tubing 34 can be cut by tearing the tubing 34 along the nearest perforation line above the last waste insertion, with an allowance of some length of tubing 34 to enable the chain of waste insertions to be closed. Closure of the chain of waste insertions may be made with a tie, a clip or some other tie or clamp mechanism. The remaining length of the tubing 34 can also be tied or clamped to seal and close off the open end of the tubing 34 before the next use in order to enable the formation of another chain of enclosed waste insertions.

After the removal of the waste (and cartridge if self-closing and single-use) and closing of the bottom end of the remaining length of tubing 34 (when the cartridge is a multi-use cartridge or a single-use cartridge with an untied beginning end), the door 100 is closed, and the latch 104 is engaged to maintain the door 100 securely in its closed position. If a new cartridge is needed, the cover 158 is pivoted upward relative to the housing 152 and the new cartridge 162 is placed on the ribs 164 with the notch 182 positioned in the step 184.

The inner surface of the cylindrical wall 154 of the housing 152 defining the waste storage compartment 90 may be provided with anti-rotation ribs or protruding members 92 as discussed above. Instead of or in addition to forming the protruding members 92 on the inner surface of the cylindrical wall of the housing 152, one or more protruding members can also be formed on the base 156 of the housing 152.

The base 156 includes an upward curved central region 156a which is designed to urge the enclosed waste insertions toward the wall 154 of the housing 152 and thus into engagement with the protruding members 92.

Referring again to FIG. 10, a replaceable battery 130 may be provided to operate the motor 56, in addition to, or in place of, the power supply which is connected to the AC mains. When a plug 61 is not plugged into a socket 59, a switch portion 63 of the socket 59 is in the closed position, thereby connecting the battery 130 to supply power to the motor 56 when switch 202 is closed and when one of the switches 204, 208 is closed (switch 204 being closed when manually depressed and switch 208 being normally closed but being open when the disengagement member 206 contacts the switch operation member 210 as shown in FIG. 8). When the plug 61 is plugged into the socket 59 to provide power to drive the motor 56, insertion of the plug 61 causes opening of the switch portion 63, thereby disconnecting the battery 130 from the circuit and connecting the power derived from the AC mains. When switch 202 is open, no power can be supplied to the motor 56, either from the battery 130 or from the AC mains.

Referring now to FIGS. 11–18, the cartridges 24, 162 described above may be designed to eliminate the need to tie the tubing 34, both at the beginning of use of the cartridge 24, 162 and when the tubing 34 is used up and/or the waste storage compartment 90 is full. The rear end of the tubing 34 is usually fixed to the cartridge 24, 162 to maintain the tubing 34 in connection with the cartridge 24, 162.

The cartridges 24, 162 can also be designed for single uses, i.e., contain an amount of tubing 34 to enable filling of the waste storage compartment 90 with only a single series of waste insertions. In this case, the cartridges 24, 162 could be made shorter as they would contain less tubing than if designed for multiple uses and thus, the waste disposal devices 10, 150 could be made shallower. A typical height of a single-use, disposable cartridge would be about ¾ to about 1 inch.

Figure 6:
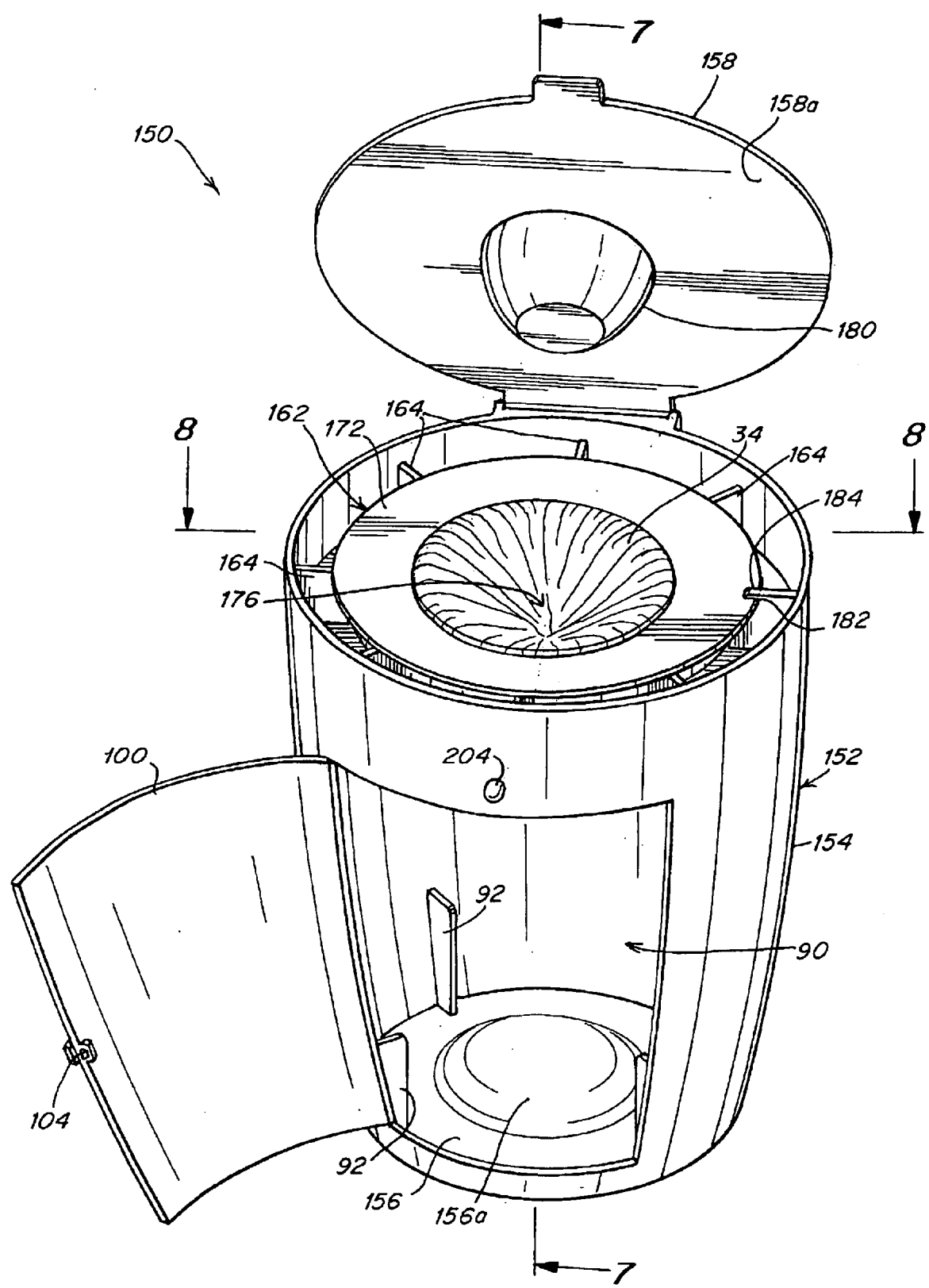
FIG. 6 is a perspective view of a second embodiment of a waste disposal device in accordance with the present invention.

The description of FIGS. 11–18 will be directed to the cartridge 162 shown in FIGS. 6 and 7 but it should be understood that the same features can be applied to the cartridges 24 shown in FIGS. 1–3.

Figure 11:
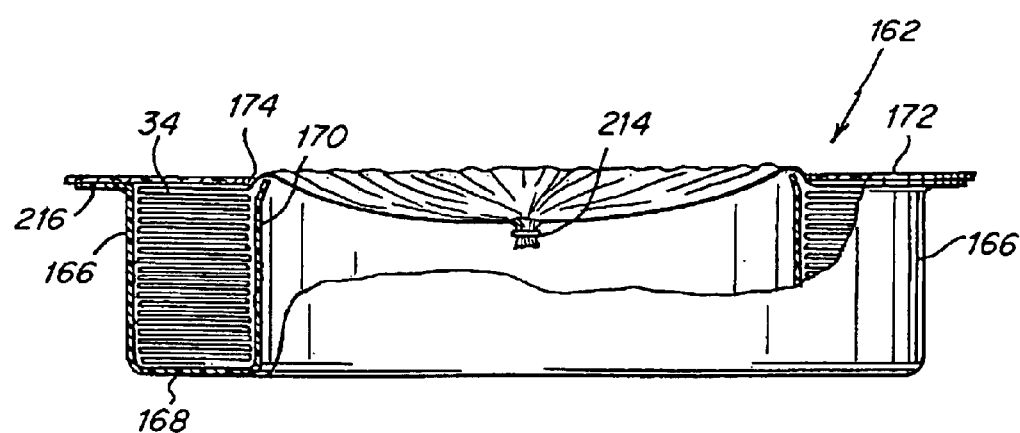
FIG. 11 is a side elevation, partly in section, of another embodiment of a cartridge of flexible tubing for use in the invention.
Figure 13:
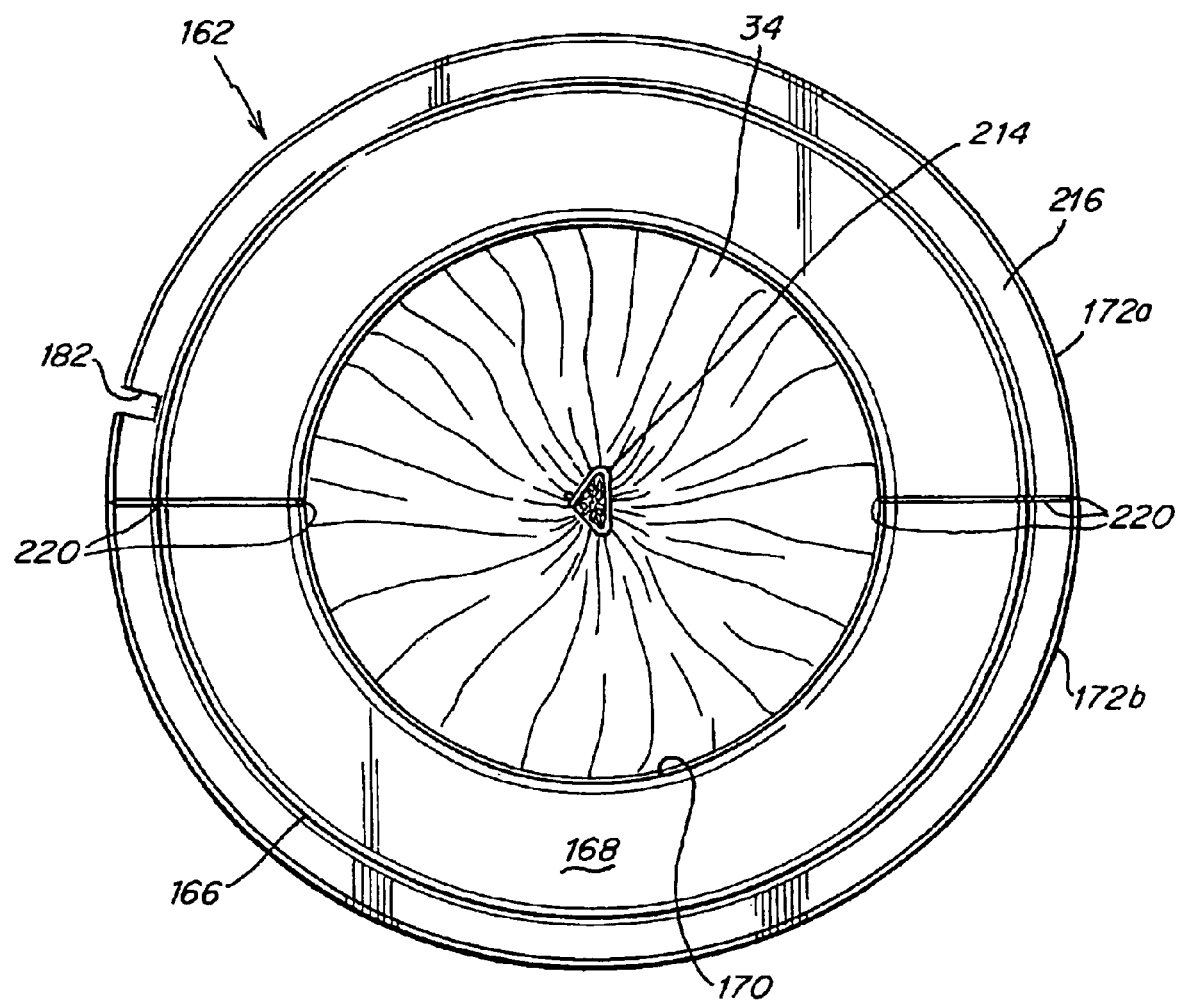
FIG. 13 is a bottom view of the cartridge shown in FIG. 11.

With respect to eliminating the need to tie the tubing 34 at the beginning of use of the cartridge 162, the cartridge 162 is constructed with the front end of tubing 34 closed, for example, by using a metal clip or clasp 214 as shown in FIGS. 11 and 13. The clasp 214 is secured to the front end of the tubing 34 during manufacture of the cartridge 162 so that the cartridge 162 is ready for use immediately upon purchase without requiring removal of a length of tubing and tying of the end of the removed length of tubing (as in conventional diaper pails of the "Diaper Genie"™ type described above).

Other mechanisms for closing the front end of the tubing 34 during manufacture of the cartridge 162 can be used in the invention instead of the metal clasp 214. For example, the end of the tubing 34 could be closed by heat-sealing (as shown in FIG. 17), formed with a closed end, or sewn closed.

With respect to eliminating the need to tie the tubing when the length of available tubing 34 is exhausted and/or the waste storage compartment 90 is full, the cartridge 162 is provided with a closure mechanism which is effective to close and seal the rear end of tubing 34 without requiring tying of the tubing 34. In the illustrated embodiment, the closure mechanism involves a particular construction of the cartridge 162 with weakened regions to allow for folding of a part of the cartridge 162 onto itself.

Figure 12:
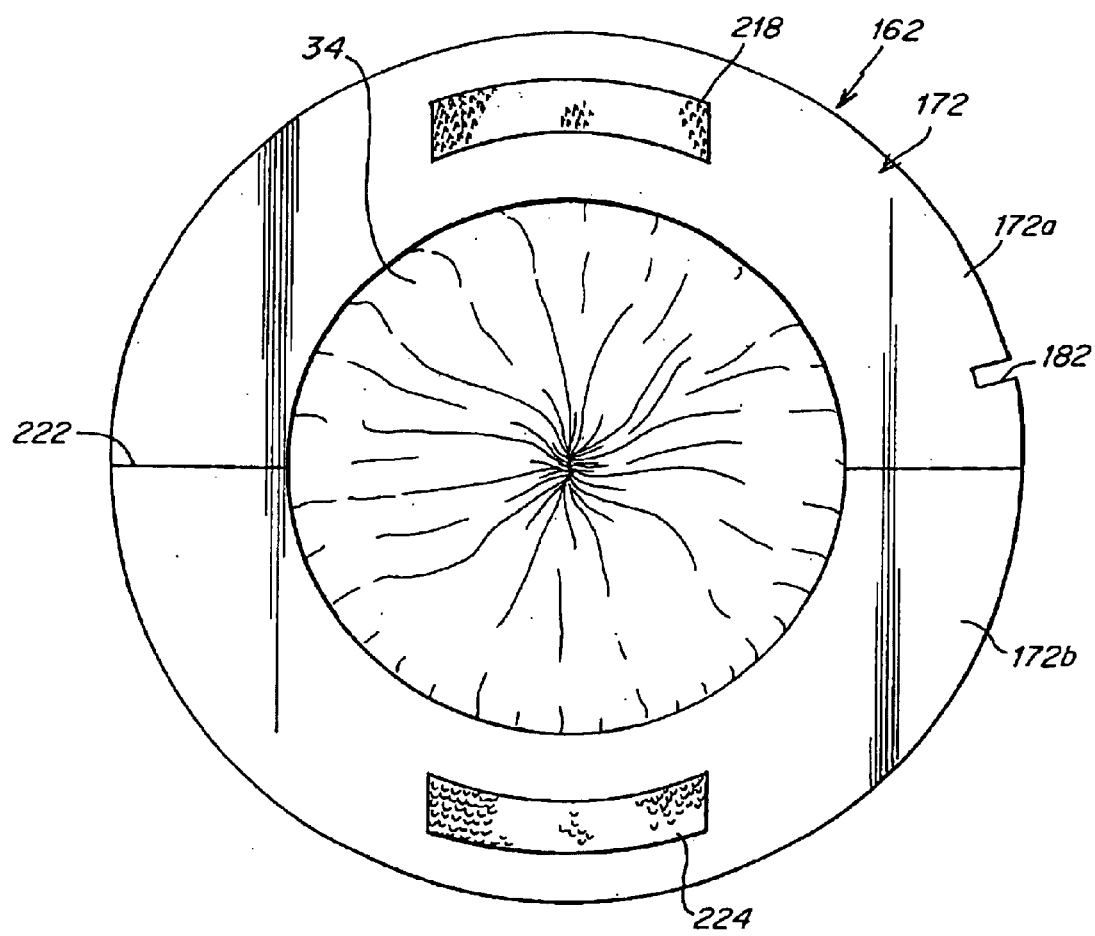
FIG. 12 is a top view of the cartridge shown in FIG. 11.

More specifically, the upper wall 172 is provided with score lines 222, which separate approximately equal parts 172a, 172b of the upper wall 172 and enable the upper wall 172 to be folded about the score lines 222, and with a mechanism to attach the folded parts 172a, 172b together (FIG. 12). Instead of score lines 222 on the upper wall 172, other types of constructions creating a weakened portion on the upper wall 172 can also be provided, for example, providing a reduced thickness along a fold line. The outer, lower and inner walls 166, 168, 170 and flange 216 are provided with slits or weakened sections 220 extending therethrough (FIG. 13). Slits 220 are substantially in alignment with the score lines 222 in the upper wall 172. As the upper wall 172 is folded about the score lines 222, the outer, lower and inner walls 166, 168, 170 and flange 216 separate into two sections about the slits 220. Depending on the thickness and composition thereof, the outer, lower and inner walls 166, 168, 170 and flange 216 may be actually be broken as the cartridge 162 is folded. Further, instead of slits 220, the outer, lower and upper walls 166, 168, 170 can be made of a material which is easily broken and score lines or slots provided to enable breaking of the casing along the score lines or slots upon folding of the cartridge 162.

The mechanism on the upper wall 172 which will attach the parts 172a, 172b thereof together may be of the Velcro® type whereby part 172a includes a section of hook fasteners 218 and part 172b includes a section of loop fasteners 224 positioned to mate with the hook fastener section 218 when the upper wall 172 is folded about the score lines 222. The size and shape of the hook and loop fastener sections 218, 224 can be varied and adjusted with a view toward obtaining a sufficiently secure bond between the parts 172a, 172b of the upper wall 172 when the upper wall 172 is folded about the score lines 222.

An alternative mechanism would be to arrange a strip of adhesive on one part 172a with a covering pad so that removal of the covering pad would expose the adhesive which would then be folded to engage the opposite part 172b.

Another alternative mechanism is shown in FIGS. 14–18 and comprises a tie 226 and a clasp 228 stamped or otherwise integrated into the upper wall 172'. Upper wall 172' also includes an aperture 230 on each part 172a',172b' which align when the cover 172' is folded. When the tubing 34 in the cartridge 162' is exhausted, the tie 226 and clasp 228 are removed from the upper wall 172', the upper wall 172' is folded about the score lines 222 and the tie 226 is inserted through the aligning apertures 230 and the clasp 228 is then attached to the tie 226 to thereby securely keep the upper wall 172' in a folded state. Alternatively, the tie 226 and clasp 228 can be used to tie off the open end of the tubing 34 in a conventional manner.

FIGS. 17 and 18 show a mechanism which eliminates the need to attach the parts of the upper wall 172 to one another in order to seal and close the tubing 34. In this embodiment, a drawstring 242 is inserted into a channel formed at the rear edge of the tubing 34. When the tubing 34 is used up, the drawstring 242 is pulled from the cartridge 162 and the exposed loops can be pulled to close the end of the tubing 34.

Once the cartridge 162, 162' is folded to close and seal the rear end of the tubing 34, it can be pushed into the waste storage compartment 90 through the waste insertion chamber 40 and the cover 158 may then be raised to enable placement of a new cartridge 162, 162' into the housing 152. The waste storage compartment 90 is emptied when full. The length of tubing 34 in the cartridge 162, 162' can be selected so that the waste storage compartment 90 is full when the tubing 34 is exhausted. In this case, emptying of the device 150 and replacement of the cartridge 162, 162' would occur simultaneously.

As shown in FIGS. 11–18, the upper wall 172 of the cartridges 162 is provided with a notch 182 to enable engagement with the step 184 formed in one of the ribs 164 and thereby prevent rotation of the cartridge 162. However, it is also possible to provide the upper wall 172 of the cartridge with one or more flanges (such as in the cartridge 124 shown in FIG. 3) to engage with projection in the housing and thereby prevent rotation of the cartridge. The flange(s) could be provided instead of or in addition to the notch. Furthermore, it is also possible to provide the outer wall 166 of the cartridge with one or more cut-out portions (such as in the cartridge 24 shown in FIGS. 1 and 3) to engage with engagement members in the housing and thereby prevent rotation of the cartridge. The cut-out portions could be provided instead of or in addition to the notch and/or flanges.

Any of the closure mechanism for closing the front end and rear end of the tubing as shown in FIGS. 11–18 can thus be applied in connection with the cartridges 24, 124 shown in FIGS. 1–4 and the cartridge 162 shown in FIGS. 6–9.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A waste disposal device, comprising:
    a housing defining a waste compartment for receiving enclosed waste;
    a cartridge removably received in said housing and containing a length of flexible tubing arranged to receive waste therein, said cartridge being maintainable in a stationary position when received in said housing;
    a retention mechanism for holding a quantity of waste received in said tubing; and
    a rotation mechanism coupled to said retention mechanism and arranged to rotate said retention mechanism, and thus the quantity of waste when received in a length of said tubing and held by said retention mechanism, while said cartridge is stationary in order to twist said tubing and enclose the held quantity of waste in the length of said tubing,
    said compartment receiving the enclosed waste.

2. The device of claim 1, wherein said retention mechanism comprises a substantially cylindrical member defining an interior, said cartridge being arranged around said cylindrical member such that said tubing passes through said interior of said cylindrical member and receives waste when in said interior of said cylindrical member.

3. The device of claim 1, wherein said retention mechanism defines a waste insertion chamber in which said tubing passes and receives waste when therein.

4. The device of claim 3, wherein said retention mechanism is arranged to impart downward movement to the waste when in said waste insertion chamber.

5. The device of claim 4, wherein said retention mechanism comprises fins extending into said waste insertion chamber, said fins being arranged to engage with said tubing receiving the waste.

6. The device of claim 5, wherein said retention mechanism further comprises a substantially cylindrical member defining said waste insertion chamber in an interior thereof, said fins being formed on said cylindrical member.

7. The device of claim 6, wherein an inward edge of said fins is inclined at an angle of about 30° to a vertical axis of said cylindrical member.

8. The device of claim 1, wherein said rotation mechanism comprises a rotatable driving gear and said retention mechanism is arranged to convert rotation of said driving gear into rotation of the held quantity of waste.

9. The device of claim 8, wherein said retention mechanism comprises a substantially cylindrical member defining a waste insertion chamber in which said tubing passes and receives waste when therein and a ring gear engaging with said driving gear.

10. The device of claim 9, wherein said retention mechanism further comprises fins arranged on said cylindrical member to extend into said waste insertion chamber, said fins being arranged to engage with said tubing receiving the waste.

11. The device of claim 10, wherein an inward edge of said fins is inclined at an angle of about 30° to a vertical axis of said cylindrical member to thereby impart downward movement to the held quantity of waste upon rotation of said cylindrical member.

12. The device of claim 9, wherein said housing comprises a flange, said ring gear resting on and being rotatable relative to said flange.

13. The device of claim 12, further comprising a holding mechanism for holding said ring gear on said flange to thereby limit movement of said ring gear in a direction away from said flange.

14. The device of claim 8, wherein said rotation mechanism further comprises a drive motor having a rotatable output shaft coupled to said driving gear.

15. The device of claim 14, further comprising a switch for actuating said drive motor.

16. The device of claim 1, further comprising a limiting mechanism for limiting rotation of said retention mechanism.

17. The device of claim 16, wherein said limiting mechanism comprises a normally closed switch arranged in said housing and a disengagement member arranged on said retention mechanism and closing said switch when in contact with said switch, whereby upon initial rotation of said retention mechanism, said disengagement member disengages from said switch and when said disengagement member re-contacts said switch, said switch is opened leading to cessation of rotation of said retention mechanism.

18. The device of claim 1, further comprising a removable cover mating with said housing, said cover including a swingable member having an open position in which a waste insertion opening is exposed and a closed position in which the waste insertion opening is closed.

19. The device of claim 1, further comprising a cartridge holding mechanism for holding said cartridge stationary during rotation of said retention mechanism.

20. The device of claim 19, wherein said cartridge includes at least one cut-out portion, said cartridge holding mechanism including at least one engagement member arranged in said housing and engaging a respective one of said at least one cut-out portion of said cartridge.

21. The device of claim 20, wherein said housing includes a housing flange, said at least one engagement member being arranged on said housing flange.

22. The device of claim 19, wherein said housing includes a housing flange, said cartridge holding mechanism comprising at least one cartridge flange arranged on said cartridge and projections arranged on said housing flange, each of said at least one cartridge flange being received between a pair of said projections.

23. The device of claim 19, wherein said cartridge includes a notch, said cartridge holding mechanism comprising a rib having a step corresponding to said notch such that when said cartridge is positioned with said step in said notch, rotation of said cartridge is prevented.

24. The device of claim 1, wherein said housing further comprises protruding members extending into said compartment for preventing rotation of the enclosed waste in said compartment.

25. The device of claim 1, further comprising a variable power supply mechanism for selectively powering said rotation mechanism using AC mains power when said rotation mechanism is coupled to a power cord or using battery power when the AC mains power is disconnected.

26. The device of claim 1, further comprising a cover pivotally connected to said housing and a pushing mechanism arranged on said cover for urging waste into said retention mechanism upon pivoting of said cover into engagement with said housing.

27. The device of claim 26, wherein said pushing mechanism comprises a truncated, cone-shaped projection removably mounted on a lower surface of said cover.

28. The device of claim 26, wherein said pushing mechanism comprises a lug formed on a lower surface of said cover.

29. The device of claim 1, further comprising a support mechanism for supporting said cartridge in said housing.

30. The device of claim 29, wherein said support mechanism comprises a plurality of ribs.

31. The device of claim 1, wherein said housing comprises a flange, said retention mechanism resting on and being rotatable relative to said flange.

32. The device of claim 31, wherein said rotation mechanism comprises a rotatable driving gear and said retention mechanism is arranged to convert rotation of said driving gear into rotation of the held quantity of waste, said driving gear extending through an aperture formed in said flange into engagement with said retention mechanism.

33. The device of claim 32, wherein said retention mechanism comprises a frame defining a waste insertion chamber and a ring gear connected to said frame, said ring gear engaging with said driving gear.

34. The device of claim 1, wherein said retention mechanism defines a waste insertion chamber and comprises resilient springs extending into said waste insertion chamber.

35. The device of claim 1, wherein said retention mechanism comprises a frame defining a waste insertion chamber and a ring gear connected to said frame.

36. The device of claim 35, wherein said housing comprises a flange, said frame including a stepped portion resting on said flange, vertically extending walls, springs extending inward into said waste insertion chamber from said vertically extending walls and a planar portion extending between said stepped portion and said vertically extending walls.

37. The device of claim 1, further comprising an on/off switch arranged on said housing to enable operation of said rotation mechanism.

38. The device of claim 1, further comprising a manually operated, momentary on switch arranged on said housing and coupled to said rotation mechanism such that depressing said momentary on switch causes activation of said rotation mechanism.

39. The device of claim 38, wherein said retention mechanism includes a disengagement member, further comprising a normally closed switch operated by said disengagement member such that depression and release of said momentary on switch causes said disengagement member to close said normally closed switch and allow continued activation of said rotation mechanism until re-engagement of said disengagement member with said normally closed switch which causes opening of said normally closed switch and cessation of activation of said rotation mechanism.

40. The device of claim 1, wherein said housing includes a perimeter wall and a base having an upwardly curved central region for urging enclosed waste insertions toward said wall.

41. The device of claim 1, wherein said cartridge comprises:
opposed substantially cylindrical inner and outer walls;
a lower wall extending between said inner and outer walls;
an upper wall having an inner edge spaced from said inner wall to define a ring-shaped opening, said tubing being arranged in a cavity defined by said inner, outer, lower and upper walls and passing out of said cavity through said ring-shaped opening; and
first closing means for closing a front end of said tubing outside of said cavity.

42. The device of claim 41, wherein said first closing means comprises a metal clip or clasp attached to the front end of said tubing.

43. The device of claim 41, further comprising second closing means arranged in connection with at least one of said inner, outer, lower and upper walls for closing and sealing a rear end of said tubing.

44. The device of claim 1, wherein said cartridge comprises:
opposed substantially cylindrical inner and outer walls;
a lower wall extending between said inner and outer walls;
an upper wall having an inner edge spaced from said inner wall to define a ring-shaped opening, said tubing being arranged in a cavity defined by said inner, outer, lower and upper walls and passing out of said cavity through said ring-shaped opening; and first closing means arranged in connection with at least one of said inner, outer, lower and upper walls for closing and sealing a rear end of said tubing.

45. The device of claim 44, wherein said first closing means comprises score lines arranged on said upper wall to enable said upper wall to be folded about said score lines, attachment means arranged on said upper wall for attaching folded parts of said upper wall to one another, and slits arranged through said outer, inner and lower walls in alignment with said score lines.

46. The device of claim 45, wherein said attachment means comprises hook and loop fasteners.

47. The device of claim 45, wherein said attachment means comprises a tie and clasp stamped into said upper wall.

48. A waste disposal device, comprising:

a housing defining a waste compartment for receiving enclosed waste;

a cartridge removably received in said housing and containing a length of flexible tubing arranged to receive waste therein, said cartridge being maintainable in a stationary position when received in said housing;

a retention mechanism for holding a quantity of waste received in said tubing, said retention mechanism comprising a substantially cylindrical member defining a waste insertion chamber in which the quantity of waste is held, said cartridge being arranged around said cylindrical member such that said tubing passes through said waste insertion chamber and receives waste therein; and a rotation mechanism coupled to said retention mechanism and arranged to rotate said retention mechanism, and thus the quantity of waste when received in a length of said tubing and held by said retention mechanism, while said cartridge is stationary in order to twist said tubing and enclose the held quantity of waste in the length of said tubing, said compartment receiving the enclosed waste.

49. The device of claim 48, wherein said retention mechanism comprises fins formed on an inner surface of said cylindrical member and extending into said waste insertion chamber, said fins being arranged to engage with said tubing receiving the waste.

50. The device of claim 49, wherein an inward edge of said fins is inclined at an angle of about 30° to a vertical axis of said cylindrical member.

51. The device of claim 48, wherein said rotation mechanism comprises a rotatable driving gear and said retention mechanism is arranged to convert rotation of said driving gear into rotation of said cylindrical member.

52. The device of claim 51, wherein said retention mechanism further comprises a ring gear engaging with said driving gear.

53. The device of claim 52, wherein said housing comprises a flange, said ring gear resting on and being rotatable relative to said flange.

54. The device of claim 52, further comprising a holding mechanism for holding said ring gear on said flange to thereby limit movement of said ring gear in a direction away from said flange.

55. The device of claim 51, wherein said rotation mechanism further comprises a drive motor having a rotatable output shaft coupled to said driving gear.

56. A waste disposal device, comprising:

a housing defining a waste compartment for receiving enclosed waste;

a cartridge removably received in said housing and containing a length of flexible tubing arranged to receive waste therein, said cartridge being maintainable in a stationary position when received in said housing;

a retention mechanism for holding a quantity of waste received in said tubing;

a rotation mechanism coupled to said retention mechanism and arranged to rotate said retention mechanism, and thus the quantity of waste when received in a length of said tubing and held by said retention mechanism, while said cartridge is stationary in order to twist said tubing and enclose the held quantity of waste in the length of said tubing, said compartment receiving the enclosed waste;

a cover pivotally connected to said housing; and a pushing mechanism arranged on said cover for urging waste into said retention mechanism upon pivoting of said cover into engagement with said housing.

57. The device of claim 56, wherein said pushing mechanism comprises a truncated, cone-shaped projection removably mounted on a lower surface of said cover.

58. The device of claim 56, wherein said pushing mechanism comprises a lug formed on a lower surface of said cover.

59. The device of claim 56, wherein said housing comprises a flange, said retention mechanism resting on and being rotatable relative to said flange.

60. The device of claim 59, wherein said rotation mechanism comprises a rotatable driving gear and said retention mechanism is arranged to convert rotation of said driving gear into rotation of the held quantity of waste, said driving gear extending through an aperture formed in said flange into engagement with said retention mechanism.

61. The device of claim 56, wherein said retention mechanism defines a waste insertion chamber and comprises resilient springs extending into said waste insertion chamber.

62. The device of claim 56, wherein said retention mechanism comprises a frame defining a waste insertion chamber and a ring gear connected to said frame, said ring gear engaging with said rotation mechanism.

63. The device of claim 62, wherein said housing comprises a flange, said frame including a stepped portion resting on said flange, vertically extending walls, springs extending inward into said waste insertion chamber from said vertically extending walls and a planar portion extending between said stepped portion and said vertically extending walls.

64. A waste disposal device adapted to removably receive a cartridge containing a length of flexible tubing, comprising:

a housing defining a waste compartment for receiving enclosed waste; a retention mechanism arranged in said housing and adapted to hold a quantity of waste received in the tubing, said retention mechanism comprising a substantially cylindrical member defining a waste insertion chamber adapted to hold the quantity of waste, said housing being arranged to position the cartridge around said cylindrical member such that the tubing in the cartridge passes through said waste insertion chamber and receives waste therein;

a rotation mechanism coupled to said retention mechanism and arranged to rotate said retention mechanism; and means for holding the cartridge stationary during rotation of said retention mechanism such that the tubing is twisted and encloses the quantity of waste.

65. A waste disposal device adapted to removably receive a cartridge containing a length of flexible tubing, comprising:

a housing defining a waste compartment for receiving enclosed waste;

a retention mechanism arranged in said housing and adapted to hold a quantity of waste received in the tubing;

a rotation mechanism coupled to said retention mechanism and arranged to rotate said retention mechanism;

means for holding the cartridge stationary during rotation of said retention mechanism such that the tubing is twisted and encloses the quantity of waste;

a cover pivotally connected to said housing; and a pushing mechanism arranged on said cover for urging waste into said retention mechanism upon pivoting of said cover into engagement with said housing.

* * * * *